US006859819B1

(12) United States Patent
Rosenberg et al.

(10) Patent No.: US 6,859,819 B1
(45) Date of Patent: *Feb. 22, 2005

(54) FORCE FEEDBACK ENABLED OVER A COMPUTER NETWORK

(75) Inventors: Louis B. Rosenberg, Pleasanton, CA (US); Sian W. Tan, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 09/628,586

(22) Filed: Jul. 31, 2000

Related U.S. Application Data

(63) Continuation of application No. 09/153,784, filed on Sep. 16, 1998, now Pat. No. 6,101,530, which is a continuation of application No. 08/691,852, filed on Aug. 1, 1996, now Pat. No. 5,956,484, which is a continuation-in-part of application No. 08/571,606, filed on Dec. 13, 1995, now Pat. No. 6,219,032.

(51) Int. Cl.$^7$ ............................................... G06F 15/16
(52) U.S. Cl. ........................ 709/203; 709/201; 345/701
(58) Field of Search ................................. 709/203, 201, 709/217; 345/701

(56) References Cited

U.S. PATENT DOCUMENTS

| | | |
|---|---|---|
| 2,906,179 A | 9/1959 | Bower |
| 2,972,140 A | 2/1961 | Hirsch |
| 3,157,853 A | 11/1964 | Hirsch |
| 3,220,121 A | 11/1965 | Cutler |
| 3,490,059 A | 1/1970 | Paulsen et al. |
| 3,497,668 A | 2/1970 | Hirsch |

(List continued on next page.)

FOREIGN PATENT DOCUMENTS

| | | |
|---|---|---|
| GB | 2254911 A | 10/1992 |
| JP | H2-185278 | 7/1990 |

(List continued on next page.)

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

(List continued on next page.)

*Primary Examiner*—Mehmet B. Geckil

(57) ABSTRACT

A method for providing force feedback over a network supporting TCP/IP protocols by: (a) sending from a client computer over a network supporting TCP/IP protocols, a connection request to a web server connected to the network that is hosting a desired URL; (b) receiving and processing an HTML file at the client computer that was sent from the web server in response to the connection request, wherein the processing includes parsing an embedded force object reference having associated parameters and building a force object therefrom; (c) developing a force feedback signal with the force object; and (d) providing force feedback to a human/computer interface device coupled to the client computer in response to the force feedback signal. A networked force feedback system of the present invention includes a network, a first computer coupled to the network, and a second computer coupled to the network, where the second computer includes a visual display and a human/computer interface device capable of providing a second computer input and providing force feedback in response to a force feedback signal provided by the second computer. The second computer develops an image on the visual display that is associated with stored feedback information, such that the second computer produces the force feedback signal in response to at least one of information derived from the first computer and of the second computer input.

20 Claims, 11 Drawing Sheets

U.S. PATENT DOCUMENTS

| | | |
|---|---|---|
| 3,517,446 A | 6/1970 | Corlyon et al. |
| 3,531,868 A | 10/1970 | Stevenson |
| 3,623,064 A | 11/1971 | Kagan |
| 3,875,488 A | 4/1975 | Crocker et al. |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,944,798 A | 3/1976 | Eaton |
| 4,114,882 A | 9/1978 | Mau |
| 4,125,800 A | 11/1978 | Jones |
| 4,127,752 A | 11/1978 | Lowthorp |
| 4,148,014 A | 4/1979 | Burson |
| 4,160,508 A | 7/1979 | Frosch et al. |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,398,889 A | 8/1983 | Lam |
| 4,448,083 A | 5/1984 | Hayashi |
| 4,464,117 A | 8/1984 | Foerst |
| 4,477,043 A | 10/1984 | Repperger |
| 4,477,973 A | 10/1984 | Davies |
| 4,484,191 A | 11/1984 | Vavra |
| 4,513,235 A | 4/1985 | Acklam et al. |
| 4,550,221 A | 10/1985 | Mabusth |
| 4,550,617 A | 11/1985 | Fraignier et al. |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,632,341 A | 12/1986 | Repperger et al. |
| 4,638,798 A | 1/1987 | Sheldon et al. |
| 4,653,011 A | 3/1987 | Iwano |
| 4,654,648 A | 3/1987 | Herrington et al. |
| 4,676,002 A | 6/1987 | Slocum |
| 4,679,331 A | 7/1987 | Koontz |
| 4,688,983 A | 8/1987 | Lindbom |
| 4,689,449 A | 8/1987 | Rosen |
| 4,692,756 A | 9/1987 | Clark |
| 4,703,443 A | 10/1987 | Moriyasu |
| 4,704,909 A | 11/1987 | Grahn et al. |
| 4,708,656 A | 11/1987 | de Vries et al. |
| 4,713,007 A | 12/1987 | Alban |
| 4,734,685 A | 3/1988 | Watanabe |
| 4,750,487 A | 6/1988 | Zanetti |
| 4,769,763 A | 9/1988 | Trieb et al. |
| 4,782,327 A | 11/1988 | Kley et al. |
| 4,787,051 A | 11/1988 | Olson |
| 4,791,934 A | 12/1988 | Brunnett |
| 4,794,392 A | 12/1988 | Selinko |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,839,838 A | 6/1989 | LaBiche et al. |
| 4,849,692 A | 7/1989 | Blood |
| 4,868,549 A | 9/1989 | Affinito et al. |
| 4,879,556 A | 11/1989 | Duimel |
| 4,885,565 A | 12/1989 | Embach |
| 4,888,877 A | 12/1989 | Enderle et al. |
| 4,891,764 A | 1/1990 | McIntosh |
| 4,891,889 A | 1/1990 | Tomelleri |
| 4,907,970 A | 3/1990 | Meenen, Jr. |
| 4,907,973 A | 3/1990 | Hon |
| 4,930,770 A | 6/1990 | Baker |
| 4,934,694 A | 6/1990 | McIntosh |
| 4,935,728 A | 6/1990 | Kley |
| 4,942,545 A | 7/1990 | Sapia |
| 4,945,305 A | 7/1990 | Blood |
| 4,945,501 A | 7/1990 | Bell et al. |
| 4,961,138 A | 10/1990 | Gorniak |
| 4,961,267 A | 10/1990 | Herzog |
| 4,962,591 A | 10/1990 | Zeller et al. |
| 4,982,504 A | 1/1991 | Soderberg et al. |
| 4,982,618 A | 1/1991 | Culver |
| 4,983,786 A | 1/1991 | Stevens et al. |
| 5,007,085 A | 4/1991 | Greanias et al. |
| 5,007,300 A | 4/1991 | Siva |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,065,145 A | 11/1991 | Purcell |
| 5,072,361 A | 12/1991 | Davis et al. |
| 5,078,152 A | 1/1992 | Bond et al. |
| 5,080,377 A | 1/1992 | Stamper et al. |
| 5,088,046 A | 2/1992 | McMurtry |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,051 A | 5/1992 | Moncrief et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A | 9/1992 | Hollis, Jr. et al. |
| 5,148,377 A | 9/1992 | McDonald |
| 5,165,897 A | 11/1992 | Johnson |
| 5,175,459 A | 12/1992 | Danial et al. |
| 5,178,012 A | 1/1993 | Culp |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,187,874 A | 2/1993 | Takahashi et al. |
| 5,212,473 A | 5/1993 | Louis |
| 5,220,260 A | 6/1993 | Schuler |
| 5,230,623 A | 7/1993 | Gutherie et al. |
| 5,240,417 A | 8/1993 | Smithson et al. |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,296,846 A | 3/1994 | Ledley |
| 5,299,810 A | 4/1994 | Pierce et al. |
| 5,309,140 A | 5/1994 | Everett, Jr. et al. |
| 5,334,027 A | 8/1994 | Wherlock |
| 5,354,162 A | 10/1994 | Burdea et al. |
| 5,386,507 A | 1/1995 | Teig et al. |
| 5,389,865 A | 2/1995 | Jacobus et al. |
| 5,396,266 A | 3/1995 | Brimhall |
| 5,397,323 A | 3/1995 | Taylor et al. |
| 5,402,582 A | 4/1995 | Raab |
| 5,405,152 A | 4/1995 | Katanics et al. |

| | | |
|---|---|---|
| 5,414,337 A | 5/1995 | Schuler |
| 5,428,748 A | 6/1995 | Davidson et al. |
| 5,429,140 A | 7/1995 | Burdea et al. |
| 5,436,622 A | 7/1995 | Gutman et al. |
| 5,436,638 A | 7/1995 | Bolas et al. |
| 5,436,640 A | 7/1995 | Reeves |
| 5,437,607 A | 8/1995 | Taylor |
| 5,451,924 A | 9/1995 | Massimino et al. |
| 5,459,382 A | 10/1995 | Jacobus et al. |
| 5,466,213 A | 11/1995 | Hogan et al. |
| 5,513,100 A | 4/1996 | Parker et al. |
| 5,547,382 A | 8/1996 | Yamasaki et al. |
| 5,551,701 A | 9/1996 | Bouton et al. |
| 5,570,111 A | 10/1996 | Barrett et al. |
| 5,575,761 A | 11/1996 | Hajianpour |
| 5,576,727 A | 11/1996 | Rosenberg et al. |
| 5,586,257 A | 12/1996 | Perlman |
| 5,589,854 A | 12/1996 | Tsai |
| 5,591,924 A | 1/1997 | Hilton |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,631,861 A | 5/1997 | Kramer |
| 5,666,473 A | 9/1997 | Wallace |
| 5,690,582 A | 11/1997 | Ulrich et al. |
| 5,691,898 A | 11/1997 | Rosenberg et al. |
| 5,721,566 A | 2/1998 | Rosenberg et al. |
| 5,734,373 A | 3/1998 | Rosenberg et al. |
| 5,766,016 A | 6/1998 | Sinclair et al. |
| 5,767,839 A | 6/1998 | Rosenberg |
| 5,785,630 A | 7/1998 | Bobick et al. |
| 5,790,108 A | 8/1998 | Salcudean et al. |
| 5,805,140 A | 9/1998 | Rosenberg et al. |
| 5,825,308 A | 10/1998 | Rosenberg |
| 5,844,392 A * | 12/1998 | Peurach et al. ............. 318/568 |
| 5,956,484 A | 9/1999 | Rosenberg |
| 5,959,613 A | 9/1999 | Rosenberg et al. |
| 5,984,880 A | 11/1999 | Lander et al. |
| 6,020,875 A | 2/2000 | Moore et al. |
| 6,028,593 A | 2/2000 | Rosenberg et al. |
| 6,111,577 A | 8/2000 | Zilles et al. |
| 6,125,385 A | 9/2000 | Wies et al. |
| 6,160,489 A | 12/2000 | Perry et al. |
| 6,161,126 A | 12/2000 | Wies et al. |
| 6,166,732 A * | 12/2000 | Mitchell et al. ............ 345/733 |
| 6,353,850 B1 * | 3/2002 | Wies et al. ................. 709/203 |
| 6,422,941 B1 | 7/2002 | Thorner et al. |

FOREIGN PATENT DOCUMENTS

| | | |
|---|---|---|
| JP | H4-8381 | 1/1992 |
| JP | 4-34610 | 2/1992 |
| JP | H5-192449 | 8/1993 |
| JP | H7-24147 | 1/1995 |
| WO | Wo 9200559 | 1/1992 |
| WO | WO 626634 A2 | 11/1994 |
| WO | wo 9502233 | 1/1995 |
| WO | WO 9502801 | 1/1995 |
| WO | WO 9510080 | 4/1995 |
| WO | WO 9520787 | 8/1995 |
| WO | WO 9520788 | 8/1995 |
| WO | WO 9532459 | 11/1995 |
| WO | WO 9616397 | 5/1996 |
| WO | WO 9622591 | 7/1996 |
| WO | WO 9628777 | 9/1996 |
| WO | WO 9642078 | 12/1996 |
| WO | WO 9712337 | 4/1997 |
| WO | WO 9719440 | 5/1997 |
| WO | WO 9720305 | 6/1997 |
| WO | WO 9721160 | 6/1997 |

OTHER PUBLICATIONS

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890;N85–28559, pp. 1–84, Mar. 1, 1985.

Jones et al., "A preceptual analysis of stiffness," ISSN 0014–4819 Springer International (Springer–Verlag:; *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., "Model–X Force–Reflecting–Hand–Controller," NT Control No. NPO–17851, JPL Case No.7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, pp. 1–369, 1990.

Tadros, "Control System Design for a Three Degree of Freedom Virtual Environment Simulator Using Motor/ Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulandum for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42,*Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of a Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings Of Fourth CISM–IF–ToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation,* MIT, Jun. 1995, archived Jul. 6, 1995.

Jacobsen et al., "High Performance, Dextrous Telerobotic Manipulator With Force Reflection," *Intervention/ROV '91 Conference & Exposition,* Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration,* Rensselaer Polytechnic Institute, Sep. 30–Oct. 1, 1992.

IBM Technical Disclosure Bulletin, "Mouse Ball—Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire,* Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation,* Nice, France, May 1992.

Eberhardt et al., "OMAR—A Haptic display for speech perception by deaf and deaf–blind individuals," *IEEE Virtual Reality Annual International Symposium,* Seattle, WA, Sep. 18–22, 1993.

Rabinowitz et al., "Multidimensional tactile displays: Identification of vibratory intensity, frequency, and contractor area, " *Journal of The Acoustical Society of America,* vol. 82, No. 4, Oct. 1987.

Bejczy et al., "Kinesthetic Coupling Between Operator and Remote Manipulator," *International Computer Technology Conference, The American Society of Mechanical Engineers,* San Francisco, CA, Aug. 12–15, 1980.

Bejczy et al. "A Laboratory Breadboard System For Dual–Arm Teleoperation," *SOAR '89 Workshop, JSC,* Houston, TX, Jul. 25–27, 1989.

Ouhyoung et al., "A Low–Cost Force Feedback Joystick and Its Use in PC Video Games," *IEEE Transactions on Consumer Electronics,* vol. 41, No. 3, Aug. 1995.

Marcus, "Touch Feedback in Surgery," *Proceedings of Virtual Reality and Medicine The Cutting Edge,* Sep. 8–11, 1994.

Bejczy, et al., "Universal Computer Control System (UCCS) For Space Telerobots," CH2413–3/87/0000/0318501.00 1987 IEEE, 1987.

Wiker, "Teletouch Display Development: Phase 1 Report," *Technical Report 1230,* Naval Ocean Systems Center, San Diego, Jul. 1988.

Yamakita et al., "Tele–Virtual Reality of Dynamic Mechanical Model," *Proceedings of the 1992 IEEE/RSJ International Conference on Intelligent Robots and Systems,* Raleigh, NC, Jul. 7–10, 1992.

Rosenberg, "Virtual Fixtures: Perceptual Overlays Enhance Operator Performance In Telepresence Tasks," *Ph.D. Dissertation,* Stanford University, Jun. 1994.

"Proceedings of the IFIP Congress 65," International Federation for Information Processing, Information Processing 1965, vol. 3, New York, May 24–29, 1965, p. 506.

"The Personal Digitizer™," Immersion Human Interface Corporation 1994.

Adachi, Yoshitaka et al, "Sensory Evaluation of Virtual Haptic Push–Buttons," Technical Research Center, Suzuki Motor Corporation, Nov. 1994.

Adelstein Bernard D. et al., "A High Performance Two Degree–of–Freedom Kinesthetic Interface," Massachusetts Institute of Technology 1992, pp. 108–112.

Adelstein, Bernard D. et al., "Design and Implementation of a Force Reflecting Manipulandum for Manual Control Research," 1992, pp. 1–24.

Atkinson, William D. et al, "Computing with Feeling," Comput. & Graphics, vol. 2, No. 2–E, pp. 97–103.

Batter, James J. et al., "Grope–1: A Computer Display to the Sense of Feel," pp. TA–4–188–TA–4–192.

Bejczy, Antal K., "The Phantom Robot: Predictive Displays for Teleoperation with Time Delay," IEEE 1990, pp. 546–550.

Burdea, Grigore et al., "Distributed Virtual Force Feedback," IEEE, May 2, 1993, pp. 25–44.

Buttolo, Pietro et al., "Pen–Based Force Display for Precision Manipulation in Virtual Environments," IEEE Mar. 1995, pp. 1–8.

Colgate, J. Edward et al., "Implementation of Stiff Virtual Walls in Force–Reflecting Interfaces," 1993, pp. 1–9.

Ellis, R.E. et al., "Design and Evaluation of a High–Performance Prototype Planar Haptic Interface," ASME Dec. 3, 1993, DSC–vol. 49, pp. 55–64.

Fischer, Patrick et al., "Specification and Design of Input Devices for Teleoperation," 1990.

Fisher, S.S. et al., "Virtual Environment Display System," ACM Interactive 3D Graphics, Oct. 1986.

Gotow, J.K., et al., "Perception of Mechanical Properties at the Man–Machine Interface," IEEE 1987, pp. 688–689.

Hannaford, Blake et al., "Performance Evaluation of a Six–Axis Generalized Force–Reflecting Teleoperator," IEEE May/Jun. 1991, vol. 21, No. 3, pp. 620–633.

Hasser, Christopher John, "Tactile Feedback for a Force–Reflecting Haptic Display," The School of Engineering, University of Dayton, Dec. 1995, pp. iii–xii &1–96.

Howe, Robert D., "Task Performance with a Dextrous Teleoperated Hand System," Proceedings of SPIE, Nov. 1992, vol. 1833, pp. 1–9.*.

Iwata, Hiroo et al, Volume Haptization, IEEE 1993, pp. 16–18.

Iwata, Hiroo, "Pen–based Haptic Virtual Environment," Institute of Engineering Mechanics, University of Tsukuba, Japan, pp. 287–292.

Jones, L.A., et al., "A Perceptual Analysis of Stiffness," Experimental Brain Research 1990, pp. 151–156.

Kelley, A.J. et al., "MagicMouse: Tactile and Kinesthetic Feedback in the Human–Compuer Interface Usiing an Electromagnetically Actuated Input/Output Device," Dept. of Elec. Engineering, Univ. of British Columbia, 1993, pp. 1–27.

Kim, Won S. et al., "Graphics Displays for Operator Aid in Telemanipulation," IEEE 1991, pp. 1059–1067.

Kim, Won S. et al., A Teleoperation Training Simulator with Visual and Kinesthetic Force Virtual Reality.

Kotoku, Tetsuo et al., "Environment Modeling for the Interactive Display (EMID) Used in Telerobotic Systems," IEEE Nov. 3–5, 1991, pp. 99–1004.

Kotoku, Tetsuo, "A Predictive Display with Force Feedback and its Application to Remote Manipulation System with Transmission Time Display," IEEE 1992, Jul. 7–10, 1992, pp. 239–246.

Krishna Roy, "Virtual Presence Takes Surgeons Through the Virtual Keyhole to Have their Skills", Computergram International, n 2698, Jul. 04, 1995 pp. 1–3.

Krueger, Myron W., Artificial Reality 1988, pp. 54–75.

Meyer, Kenneth et al., "A Survey of Position Trackers," The Massachusetts Institute of Technology 1992, Presence, vol. 1, No. 2.

Minsky, Margaret et al., "Feeling and Seeing: Issues in Force Display," ACM 1990, pp. 235–242.

Noll, A. Michael, "Man–Machine Tactile Communication Dissertation," Polytechnic Institute of Brooklyn, Jun. 1971, pp. 1–88.

Ouh–young, Ming et al., "Force–Display Performs Better than Visual Display in a Simple 6–D Docking Task," IEEE 1989, pp. 1462–1466.

Ouh–young, Ming et al., "Using a Manipulator for Force Display in Molecular Docking," IEEE 1988, pp. 1824–1829.

Ouh–Young, Ming, "Force Display in Molecular Docking," Chapel Hill 1990, pp. 1–85.

Precision Machine Design, Slocum, Prentice Hall, pp. 661, 664.

Gossweiler, Rich et al, "An Introduced Tutorial for Developing Multi–User Virtual Environments," Presence: Teleoperators and Virtual Environments, MIT Press, 3(4), Fall 1994 pp. 255–264.

Rosenberg et al., "Commercially Viable Force Feedback Controller for Individuals with Neuromotor Disabilities," AL/CF–TR–1997–0016, Crew Systems Directorate, Wright Patterson AFB, OH, May 1996.

Rosenberg et al., "Using Force Feedback to Enhance Human Performance in Graphical User Interfaces", Apr. 1996.

Rosenberg, Louis B. et al., "Perceptual Decomposition of Virtual Haptic Surfaces," IEEE, Oct. 1993.

Rosenberg, Louis B., "Perceptual Design of a Virtual Rigid Surface Contact," Center for Design Reseach Stanford University, Air Force Material Command, Apr. 1993, pp. 1–41.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Rosenberg, Louis B., "The Use of Virtual Fixtures to Enhance Operator Performance in Time Delayed Teleoperation," Armstrong Laboratory, Mar. 1993, pp. 1–45.

Russo, Massimo Andrea, "The Design and Implementation of a Three Degree–of–Freedom Force Output Joystick," Department of Mechanical Engineering, May 11, 1990, pp. 9–40 & 96 & 97.

Schmult, Brian et al., "Application Areas for a Force–Feedback Joystick," ASME 1993, DSC–vol. 49, pp. 47–54.

Smith, Geoffrey, "Call It Palpable Progress," Business Week, Oct. 9, 1995, p. 93, 96.

Su, S. Augustine et al., "The Virtual Panel Architecture: A 3D Gesture Framework," IEEE 1993, pp. 387–393.

Tan, Hong Z et al., "Manual Resolution of Compliance When Work and Force Cues are Minimized," ASME 1993, DSC–vol. 49, pp. 99–104.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Winey III, Calvin, "Computer Simulated Visual and Tactile Feedback as an Aid to Manipulator and Vehicle Control", Massachusetts Institute of Technology, Jun. 1981.

Yamakita, M. et al., Tele–Virtual Reality of Dynamic Mechanical Model, IEEE Jul. 7–10, 1992, pp. 1103–1110.

Yasuyoshi Yokokohji et al, "What You Can See is What You Can Feel–Development of a Visual/Haptic Interface to Virtual Environment," IEEE Proceedings of VRAIS'96 Jan. 96, pp. 46–54.

Tavkhelidze, D.S., "Kinematic Analysis of Five–Link Spherical Mechanisms," Mechanism and Machine Theory, 1974, vol. 9, pp. 181–190.

Walso, Cursor, "Designer's Corner–Useful Technology for Your Idea File," Design News, Mar. 7, 1993, p. 63.

Rosenberg, Louis B., Crew Systems Directorate Biodynamics and Biocommunications Division Wright–Patterson, Air Force Material Command, Mar. 1993, pp. 1–45.

Repperger, D.W., "Active Force Reflection Devices in Teleoperation", IEEE Control Systems, 1991, pp. 52–56.

Jones, L.A., et al., "A Perceptual Analysis of Stiffness," Experimental Brain Research 1990, pp. 151–156.

Burdea, Grigore et al., "Dextrous Telerobotics with Force Feedbacks–An Overview," Robotica 1991, vol. 9.

"High Performance Model of the Immersion–Probe," Immersion–Probe–MD™, Immersion Human Interface Corporation.

3D Human Interface Tool, Immersion Probe™., Immersion Human Interface Corporation 1994.

"Useful Technology for Your Idea File," Design News, Mar. 7, 1994, pp. 63.

Herndon, J.N. et al., "The State–of–the–Art Model M–s Maintence System," Proceedings of the 1984 National Topical Meeting on Robotics and Remote Handling in Hostile Environments, American Nuclear Society, pp. 59–65.

"Foot–Operated Mouse," IBM Technical Disclosure Bulletin, Apr. 1986, vol. 28, No. 11.

Snow, E. et al., "Compact Force–Reflecting Hand Controller," JPL, Apr. 1991, vol. 15, No. 3, Item No. 153, pp. 1–15a.

Hannaford, B. et al., "Force Feedback Cursor Control," NASA Technical Brief, vol. 13, No. 11, Item #21, 1989, pp. i, 1–4.

Ouh–young, M. et al., "Creating an Illustion of Feel: Control Issues in Force Display," Computer Science Dept., Univ. of N. Carolina, 1989, pp. 1–14.

Ramstein, C. et al., "The Pantograph: A Large Workspace Haptic Device for a Multimodal Human–Computer Interaction," Computer–Human Interaction, CHI '94, 1994.

Millman, P., "Design of a Four Degree–of–feedom Force–Reflecting Manipulandum with a Specified Force/Torque Workspace," Proc. of the 1991 IEEE Int'l Conf. on Robotics and Automation, 1991, pp. 1488–1493.

Hirota, K., "Development of Surface Display," IEEE 0–7803–1363, 1993, pp. 256–262.

Ansley, D., "Thimble gets in touch with reality," New Scientist, 1994, p. 19.

Brooks, F. et al., "Project GROPE—Haptic Displays for Scientific Visualization," Computer Graphics, vol. 24, No. 4, Aug. 1990, pp. 177–185.

Iwata, H. "Artificial Reality with Force–feedback: Development of Desktop Virtual Space with Compact Master Manipulator," Computer Graphics, vol. 24, No. 4, Aug. 1990, pp. 165–170.

Kilpatrick, P., "The Use of a Kinesthetic Supplement in an Interactive Graphics System," Univ. of North Carolina, 1976.

Tan, Hong Z. et al., "Human Factors for the Design of Force–Reflecting Haptic Interfaces," Tan, Srinivasan, Eberman, & Chang, ASME WAM 1994, pp. 1–11.

Aukstakalnis et al., "Silicon Mirage: The Art and Science of Virtual Reality," ISBN 0–938151–82–7, pp. 129–180, 1992.

Bliss, "Optical–to–Tactile Image Conversion for the Blind," IEEE Transactions on Man–Machine Systems, vol. MMS–11, No. 1, pp. 58–65, Mar. 1970.

Calder, "Design of A Force–Feedback Touch–Introducing Actuator For Teleoperator Robot Control," Bachelor of Science Thesis, MIT, Jun. 23, 1983.

"Cyberman Technical Specification," Logitech Cyberman SWIFT Supplement, Apr. 5, 1994.

Eberhardt et al., "Inducing Dynamic Haptic Perception by The Hand: System Description and Some Results," DSC–vol. 55–1, Dynamic Systems and Control: Vol. 1, ASME 1994, pp. 345–351.

Gobel et al., "Tactile Feedback Applied to Computer Mice," International Journal of Human–Computer Interaction, vol. 7, No. 1, pp. 1–24, 1995.

Johnson, "Shape–Memory Alloy Tactile Feedback Actuator," Armstrong Aerospace Medical Research Laboratory, AAMRL–TR–90–039, Aug., 1990.

Kaczmarek et al., "Tactile Displays," Virtual Environment Technologies, pp. 349–414.

Bontarinis et al., "Tactile Display of Vibratory Information in Teleoperation and Virtual Environments," PRESENCE, vol. 4, No. 4, pp. 387–402, 1995.

Lake, "Cyberman from Logitech," GameBytes, 1994.

Noll, "Man–Machine Tactile," SID Journal, Jul./Aug. 1972 issue.

Ouhyoung et al., "The Development of A Low–Cost Force Feedback Joystick and its Use in the Virtual Reality Environment," Proceedings of the Third Pacific Conference on Computer Graphics and Applications, Pacific Graphics '95, Seoul, Korea, 21–24 Aug. 1995, pp. 309–319.

Pimentel et al., "Virtual Reality: through the new looking glass," $2^{nd}$ Edition; McGraw–Hill, ISBN 0–07–050167–X, pp. 41–202, 1994.

Patrick, "Design, Construction, and Testing of a Fingertip Tactile Display for Interaction with Virtual and Remote Environments," Master of Science Thesis, MIT, Nov. 8, 1990.

"Component Maintenance Manual With Illustrated Parts List, Coaxial Control Shaker Part No. C–25502," Safe Flight Instrument Corporation, Revised Jan. 28, 2002 (3 pages).

"Technical Manual Overhaul Instructions With Parts Breakdown, Coaxial Control Shaker Part No. C–25502," Safe Flight Instrument Corporation, Revised Jul. 15, 1980 (23 pages).

Scannell, "Taking a Joystick Ride," Computer Currents, Boston Edition, vol. 9, No. 11, Nov. 1994.

* cited by examiner

```
<HTML> ~162
<BODY> ~164
    ⋮ }~166
<CENTER> ~168
<EMBED "FORCEBUTTON.IFF; ~172
    SIZE = 100,100 ~174
    INITSTATE = UP ~176
    FORCEEFFECT = VIBRATION(PARAMS) ~178
    TRIGGER = MOUSEWITHIN(PARAMS) +
                BUTTONSTATE ~182
    ICON = LOUIS.GIF ~184
    TEXT = "HI, I'M LOUIS" ~186
    FONT = HELVETICA ~188
>
</CENTER> ~190
    ⋮ }~192
</BODY> ~194
</HTML> ~196
```

```
FOR (INT i = 0; i < 5; i++)
    VIBRATE(PARAMS);
    WAIT 5;
```

*Figure 7b*

FORCE FEEDBACK ENABLED OVER A COMPUTER NETWORK

This is a Continuation application of prior U.S. application Ser. No. 09/153,784, filed on Sept. 16, 1998, now U.S. Pat. No. 6,101,530, which is a Continuation application of prior application Ser. No. 08/691,852 filed on Aug. 1, 1996 now U.S. Pat. No. 5,956,484, which is a continuation-in-part of prior application Ser. No. 08/571,606, filed on Dec. 13, 1995, now U.S. Pat. No. 6,219,032, which is a Continuation-in-Part of prior application Ser. No. 08/566,282, filed Dec. 1, 1995, now U.S. Pat. No. 5,734,373, the disclosures of which are incorporated herein by reference.

BACKGROUND OF THE INVENTION

This invention relates generally to human/computer interfaces, and more particularly to human/computer interfaces with force feedback that can operate over a network.

The Internet has, of late, become extremely popular. The origins of the Internet date back several decades to a U.S. government sponsored military/research/business wide area network (WAN) that was designed to remain operational even in the event of the catastrophe, e.g. a major earthquake or a nuclear war. To accomplish this goal, robust protocols and systems were developed which allowed a geographically distributed collection of computer systems to be connected as a WAN such that the loss of a particular computer, or group of computers, would not preclude the continued communication among the remaining computers.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet. With the World Wide Web, an entity having a domain name creates a "web page" or "page" which can provide information and, to a limited degree, some interactivity.

A computer user can "browse", i.e. navigate around, the WWW by utilizing a suitable web browser and a network gateway (e.g., an Internet Service Provider (ISP)). For example, UUNET, America Online, and Global Village all provide Internet access. Currently, the most popular web browser, known as the Netscape® Navigator®, is made by Netscape Corporation of Mountain View, Calif. The web browser allows a user to specify or search for a web page on the WWW, and then retrieves and displays web pages on the user's computer screen.

The Internet is based upon a transmission protocol known as "Transmission Control Protocol/Internet Protocol" (or "TCP/IP" for short), which sends "packets" of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based upon Internet standards, and have become quite common for managing information and communications within an organization. Intranets, since they adhere to Internet standards, can often use the same web browser software and web server software as are used on the Internet.

A web page typically includes static images and text. The images and text are specified in a "HyperText Mark-up Language" ("HTML") file that is sent from the web server to the client machine. This HTML file is parsed by the web browser in order to display the text and images on the display of the client machine. Other standardized languages or protocols are also being developed for use with the Internet and the World Wide Web. For example, the Virtual Reality Modeling Language (VRML) is used to provide visual virtual 3-D environments and allow one or many users to navigate through and interact as "avatars" in such an environment using a client computer system.

The Internet and the WWW also permit sound data to be transmitted over the Internet. For example, references to sound files can be embedded in HTML pages and can be played by the web browser. Data "packets" coded in TCP/IP format can also be sent from one client machine to another over the Internet to transmit sound data. This last-mentioned technique forms the basis for Internet telephony.

While the transmission of visual images (both static and dynamic, i.e. video), text, and sound over the Internet is well-known, the transmission of other types of sensory data has not been well explored. In particular, the transmission of data over the Internet pertaining to the sense of touch and/or force has not been established. "Force feedback" allows a user to experience or "feel" tactile sensations as provided through computational information. Using computer-controlled actuators and sensors on a force feedback device, a variety of realistic sensations can be modeled and experienced by the user. This useful and highly immersive sensory modality for interacting with the Internet has hereto been unavailable.

SUMMARY OF THE INVENTION

The present invention is related to the transmission of information pertaining to a subset of the sense of touch, i.e. the transmission of forces to a user over a computer network system. The "force feedback" provided by the methods and apparatus of the present invention enhance the sensory experience of the user to provide a richer, more interesting, and more enjoyable experience.

In a preferred method of the present invention for providing force feedback over a network, a connection is first established between a server machine and a client machine. The client machine (typically a personal computer), has a visual display (e.g., a computer video monitor) and a force feedback human/computer interface device. Examples of force feedback human/computer interfaces (hereafter "force feedback devices") include force feedback joysticks, mice, trackballs, steering wheels, and yokes. In some embodiments of the present invention, the force feedback device preferably constrains movement to two degrees of freedom to match a two-dimensional configuration of the visual display. Three or more degrees of freedom of movement can be provided in other embodiments. Next, the client machine receives from the server machine both screen display information and force feedback information that is related to the screen display information. Preferably, the screen display information and force feedback information are encoded in an HTML web page file. Files and data in other protocols or languages can also be used, such as VRML. Next, the client machine displays on the monitor an image generated from the screen display information. The force feedback device provides a pointer event and/or a button event to the client with respect to the screen image, and a force feedback signal is computed based upon the detected events and the force feedback information stored on the client machine. Finally, a force feedback is provided to a user by the force feedback device based upon the force feedback signal.

Preferably, the force feedback device is provided with a local microprocessor which communicates with the client machine. The force feedback device further includes sensors and actuators coupled to the local microprocessor such that the force feedback signal can take the form of a relatively high-level force feedback command. The local microprocessor parses the force feedback command to control the actuators of the human/computer interface in a control loop with the sensors.

Another preferred method of the present invention for providing force feedback over a network establishes a connection between a first computer and a second computer over a network. The first computer includes a computer input device which develops a first computer input, and a second computer includes a visual display and a force feedback device for providing a second computer input. The computer input device of the first computer may or may not also be a force feedback device. A screen image is displayed on the monitor of the second computer that is associated with stored force feedback information. A computer input is received from the first computer over the network, and a force feedback signal, based on the stored force feedback information and upon at least one of the first computer input and the second computer input, is determined. Finally, a force feedback is provided with the force feedback device in response to the force feedback signal such that it is correlated with the screen image on the second computer.

A preferred method of the present invention for providing force feedback over a network supporting TCP/IP protocols includes: (a) sending a connection request from a client computer over a network supporting TCP/IP protocols to a web server connected to the network that is hosting a desired URL; (b) receiving, parsing, and interpreting (i.e. "processing") an HTML file at the client computer that was sent from the web server in response to the connection request, wherein the processing includes parsing an embedded force object reference having associated parameters and building a force object that is specified by the force object reference and the parameters; (c) developing a force feedback signal from the force object; and (d) providing force feedback to a user of the force feedback device coupled to the client computer in response to the force feedback signal.

Preferably, the HTML file is a web page of the web server and the parsing is provided by an enhanced web browser. Even more preferably, the web browser is provided with a software "plug-in" to aid in the processing of the embedded force object reference, the building of the force object, and the development of the force feedback signal.

A network force feedback system in accordance with the present invention includes a network, a first computer coupled to the network, and a second computer coupled to the network, where the second computer includes a visual display and a force feedback device capable of providing a second computer input to the second computer, and further being capable of providing force feedback to a user in response to a force feedback signal provided by the second computer. Preferably, the force feedback device includes a local microprocessor that communicates with the second computer such that the force feedback signal can take the form of a relatively high-level force command. The second computer develops an image on the visual display that is correlated to stored feedback information, such that the second computer produces the force feedback signal in response to at least one of information provided from the first computer and of the second computer input. The first computer can either be a server computer or, like the second computer, another client computer coupled to the network. The present invention therefore permits a computer user to experience force feedback over the network.

In the network force feedback system, information pertaining to force feedback can be downloaded from a server computer to the second or "client" machine. Alternatively, force feedback signals can be sent over the network between a first "client" machine and a second "client" machine on a peer-to-peer basis, or from a server to one or more peers in a server-to-peer basis.

The present invention adds a new sensory modality when interacting with a networked computer system. More particularly, force information can be either downloaded to a client machine from a server machine connected to the network, or force information can be passed between two or more client machines on the network. When force information is downloaded from a server, the client machine parses and interprets the force information and directly controls its interaction with the force feedback device on an essentially real-time basis. In contrast, peer-to-peer or server-to-peer direct interaction over the network may be subject to some transmission ("latency") delays, but permits remote interactivity with a client's force feedback device.

These and other advantages of the present invention will become apparent upon reading the following detailed descriptions and studying the various figures of the drawings.

BRIEF DESCRIPTION OF THE DRAWINGS

FIG. 4b is a cross-sectional view taken along line 4b—4b of FIG. 4a;

FIG. 5b is a perspective view of a first alternate embodiment for the force feedback device of FIG. 5a;

FIG. 5c is a perspective view of a second alternate embodiment of the force feedback device of FIG. 5a;

FIG. 7b is an example of an HTML file of the present invention sent from a web server machine to a client machine;

FIG. 8 is a flow-diagram of the "Parse and Interpret HTML Component" step of FIG. 7a;

DETAILED DESCRIPTION OF THE PREFERRED EMBODIMENTS

Figure 1:
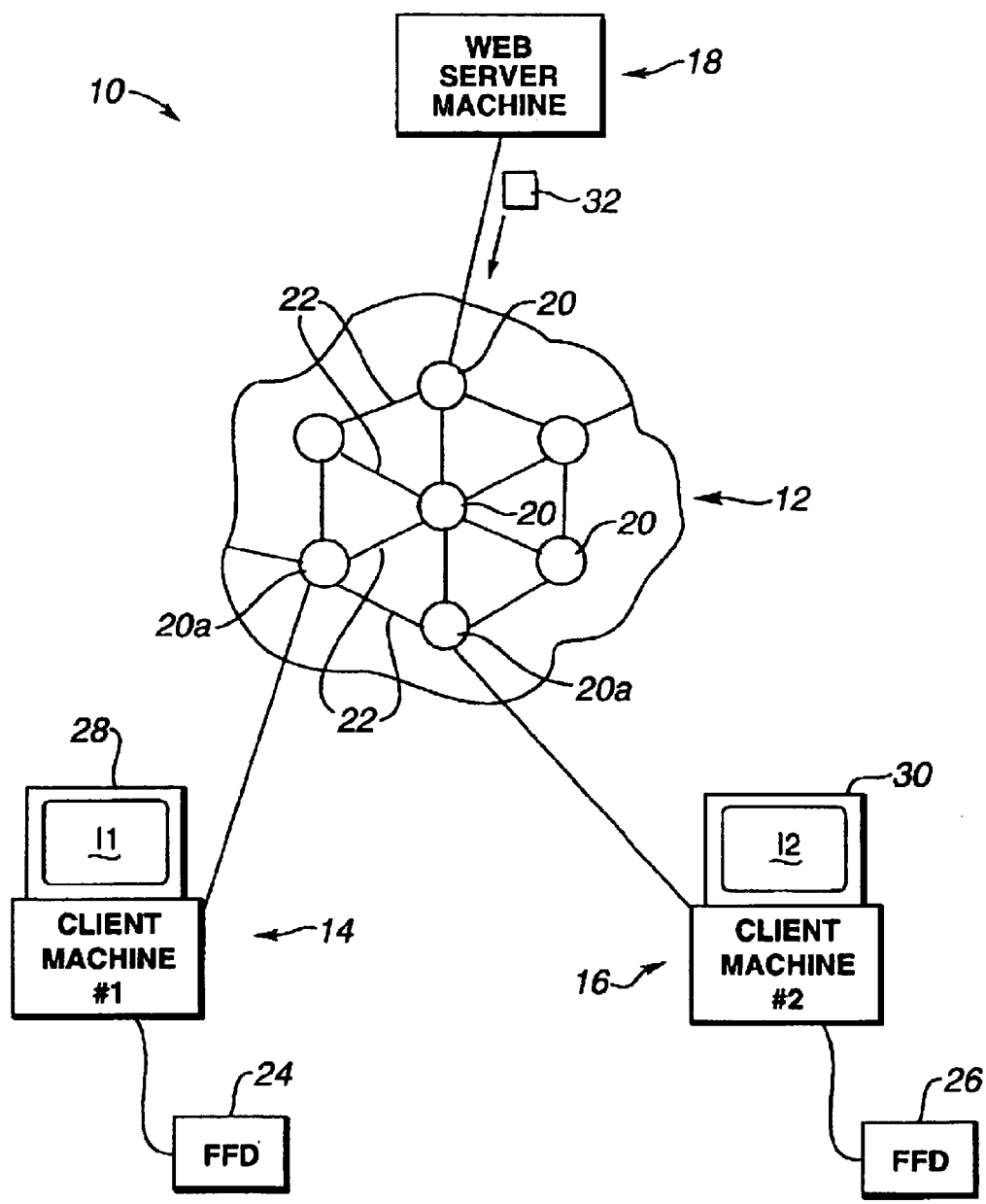
FIG. 1 is a pictorial representation of the Internet, a web server machine, and two client machines.

In FIG. 1, a network system 10 includes a wide area network (WAN) such as the Internet 12, and a number of computers or "machines" coupled to the Internet 12. For example, a first client machine 14, a second client machine 16, and a web server machine 18, are coupled to the Internet 12.

As noted previously, both the Internet 12 and Intranets operate using the same TCP/IP protocols. This allows Intranets to use similar or the same server machine software and client machine software as are used in Internet 12 applications. Therefore, it will be apparent to those skilled in the art that the following descriptions apply equally well to Internet, Intranet, and other forms of network systems that are compatible with the processes and apparatus disclosed herein.

The Internet 12 includes a number of nodes 20 that are interconnected by data transmission media 22. These nodes are typically routers, switches, and other intelligent data transmission apparatus which route "packets" of TCP/IP information to the desired destination. In some instances, the nodes 20 comprise an Internet service provider (ISP) 20a which allows a client machine to access the "backbone" of the Internet. Alternatively, client machines and web servers can be coupled directly into the backbone of the Internet.

As noted previously, the present invention is directed to the implementation of force feedback over a network, such as the Internet 12. To provide a user of a client machine with the experience of force feedback, force feedback human/computer interfaces (hereafter "force feedback devices") 24 and 26 can be provided as part of the client machines 14 and 16, respectively. The client machines 14 and 16 are typically provided with computer video monitors 28 and 30 (which is one example of a "visual display"), respectively, which can display images I1 and I2, respectively. Preferably, forces developed by force feedback devices 24 and 26 are correlated with the images I1 and I2 of the client machines 14 and 16, respectively.

The machines 14–18 are considered, in the language of the Internet, to be "resources," and each has its own unique Uniform Resource Locator or "URL." In one embodiment of the present invention, a client machine, such as client machine 14 or 16, sends a request for a "web page" residing on, for example, web server machine 18. This is accomplished by the client machine sending a connection request and a URL which specifies the address of the web page to the web server machine 18. The web server machine 18 then sends a web page 32 written in HTML format back to the requesting client machine where it is "cached" in the memory (typically the RAM, hard disk, or a combination of the two) of the client machine. In this embodiment of the invention, the image on the video display of the client machine is generated from the HTML web page file cached on the client machine, and force feedback is provided to a user through the force feedback device as he manipulates a user manipulable object of the force feedback device.

In another aspect of the present invention, a first client machine, such as client machine 14, and a second client machine, such as client machine 16, directly communicate force feedback commands to each other in standard TCP/IP protocol over the Internet 12. More particularly, client machine 14 can send force feedback and other information to the URL of the client machine 16, and the client machine 16 can send force feedback and other information in standard TCP/IP packets to the URL of the client machine 14. In this way, users of client machine 14 and client machine 16 can interact physically over the Internet 12. Of course, a server machine 18 can likewise directly communicate force feedback commands to a client machine 12 or 14, or all three machines can interact.

Figure 2:
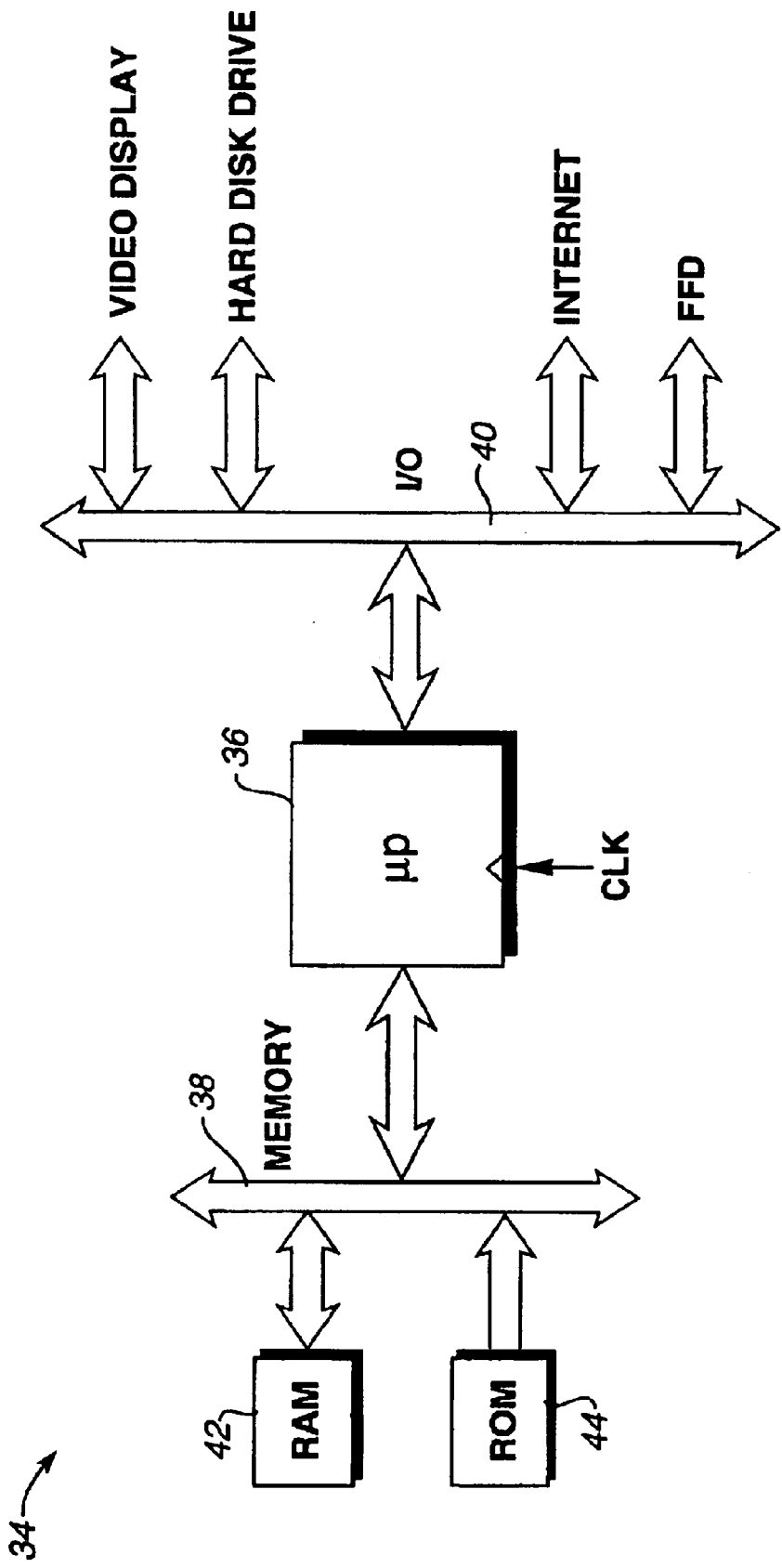
FIG. 2 is a block-diagram of a client machine used in the present invention.

In FIG. 2, a "personal" computer 34 architecture that can be used for client machine 14 or client machine 16 is shown in block diagram form. It should be noted that a variety of machine architectures can be used to access the Internet 12, i.e. can be used as "network access computers." The particular architecture shown for the computer 34 is a typical personal or "PC" computer architecture, such as that used with IBM compatible personal computers. Web server machines can also have similar architectures, but are often more powerful computers known as "workstations" that operate under some variant of the UNIX® operating system. The Internet service providers 20a are likewise often UNIX-based computers or powerful personal computers running Windows NT®. The nodes 20 are most commonly routers built by Cisco Systems of San Jose, Calif. Client machine 14 or 16 can also take other forms, such as a television including or connected to a microprocessor for Internet access. Force feedback devices used with such client machines can be appropriate for the particular embodiment, e.g., a TV remote control used for internet browsing on the abovementioned television can include force feedback functionality.

The personal computer system 34 includes a microprocessor 36 clocked by a system clock CLK and which is coupled to a high speed or memory bus 38 and to a lower speed or I/O bus 40. The system RAM 42 and ROM 44 are typically coupled to the high speed memory bus, while various peripherals, such as the video display, hard disk drive, Internet interface (often either a modem or an Ethernet connection), and force feedback device, are typically coupled to the slower I/O bus. The microprocessor executes programs stored in the various memories (RAM, ROM, hard disk, etc.) of the personal computer 34 to control, for example, the image display on the video display and the forces provided by the force feedback device. The manufacture and use of personal computers, such as personal computer 34, are well-known to those skilled in the art.

Figure 3:
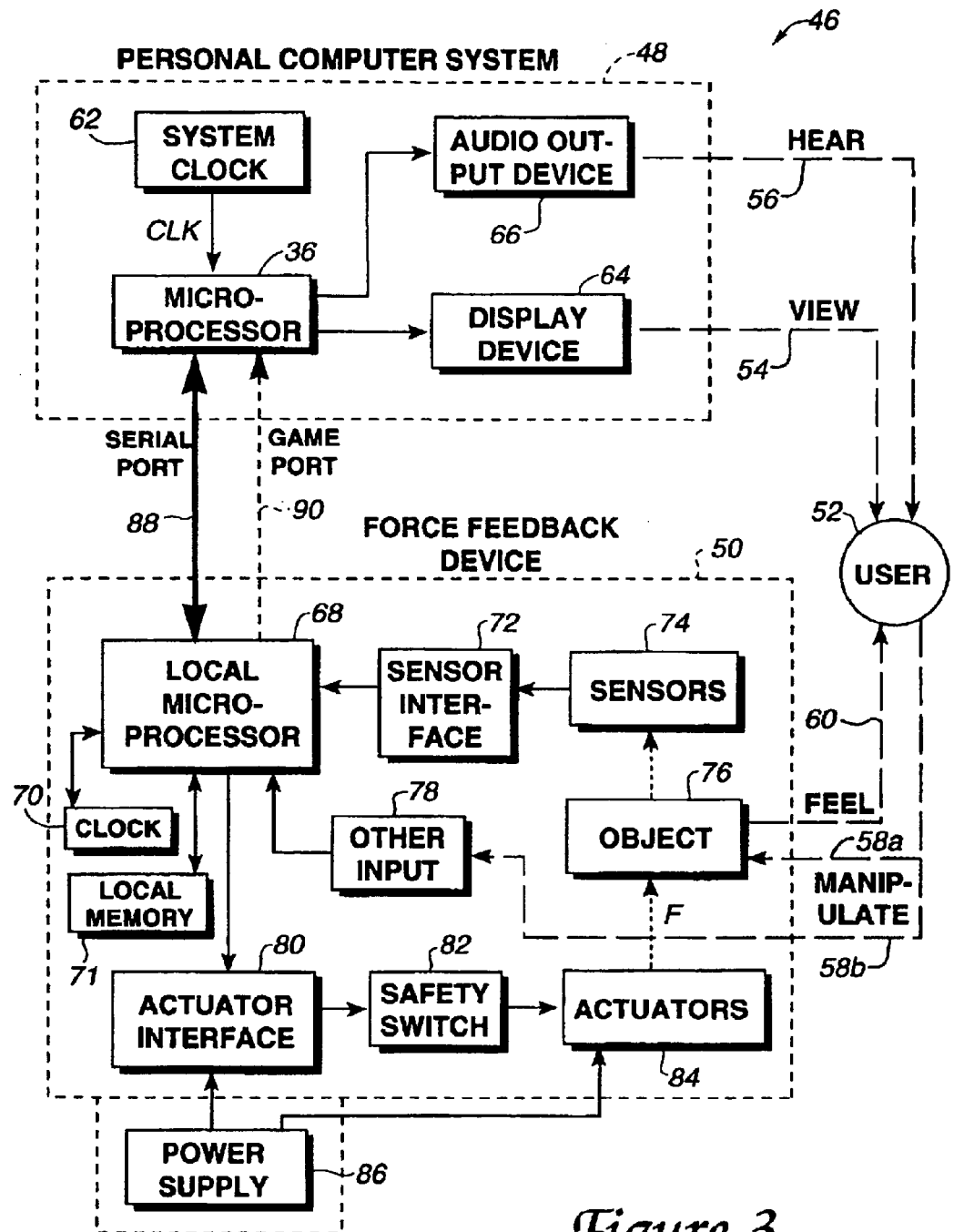
FIG. 3 is a block-diagram of a force feedback system in accordance with the present invention.

In FIG. 3, a client machine 46 in accordance with the present invention includes a personal computer system 48 and a force feedback human/computer interface or "force feedback device" 50. A user 52 can receive visual information 54 and auditory information 56 from the personal computer 48 and can manipulate the force feedback device 50 as indicated at 58a and 58b to provide input, e.g., to command a cursor location on a visual display or other provide other control information. In addition, the user 52 can receive force feedback 60 from the force feedback device 50 to represent physical "feel" sensations.

The personal computer system 48 includes the microprocessor 36, the system clock 62, a video monitor 64 (which is one type of "visual display"), and an audio device 66. The system clock 62, as explained previously, provides a system clock signal CLK to the microprocessor 36 and to other components of the personal computer system 48. The display device 64 and the audio output device 66 are typically coupled to the I/O bus 40 (not shown in this figure).

In this preferred embodiment, the force feedback device 50 preferably includes a local microprocessor 68, a local clock 70, optional local memory 71 for the local microprocessor 68, a sensor interface 72, sensors 74, a user manipulatable object 76, "other" input interface 78, an actuator interface 80, a safety switch 82, and actuators 84 which provide a force F to the object 76, and an optional power supply 86 to provide power for the actuator interface 80 and actuator 84.

The microprocessor 36 of the personal computer system 48 is coupled for communication with the local microprocessor 68 of the force feedback device 50. This communication coupling can be through a serial port coupling 88 to the personal computer system, or through a game port coupling 90 to the personal computer system. Virtually all personal computer systems built to the IBM PC/AT standards will include a serial port and a game port. As noted, the serial port will permit two-way communication between microprocessor 36 and microprocessor 38, and thus is preferable over the game port coupling which only permits one-way communication from the local processor 68 to the microprocessor 36. In consequence, a serial port connection between the personal computer system 48 and the force feedback device 50 will permit force feedback commands to be sent from the microprocessor 36 to the local microprocessor 68, while a game port connection alone will not be able to provide this function. However, some simpler forms of "reflex" type force feedback can still be provided by the force feedback device 50 under the control of the local microprocessor 68 even if only a game port interface is used. It should also be noted that the microprocessor 36 and a local microprocessor 68 can communicate over both the serial port connection and the game port connection to provide a greater communication bandwidth. A preferred serial port is the Universal Serial Bus (USB) of a personal computer, although an RS-232 serial bus, or other serial busses, a parallel bus, an ethernet bus, or other types of interfaces or communication links can also be used.

In use, the user 52 of the client machine 46 grasps the object 76 of the force feedback device 50 and manipulates (i.e. exerts a force to move or attempt to move) the object to cause a "pointer" icon to move in the image displayed by the display device 64. This pointer icon typically takes the form of a small arrow, a pointing hand, or the like. The sensor 75 senses the movement of the object 76 and communicates the movement to the local microprocessor 68 through the sensor interface 72. The local microprocessor 68 then communicates through serial port 88, game port 90, or both to the microprocessor 36 to cause the microprocessor 36 to create a corresponding movement of the pointer icon on the image displayed upon the visual display 64. In some embodiments, the sensors 74 can communicate directly to microprocessor 36 without the use of local microprocessor 68. The user can also create other input, such as a "button click," through the other input 78 which are communicated to the microprocessor 36 by the local microprocessor 68 or directly, e.g., using a game port.

If the pointer icon on the display device 64 is at a position (or time) that correlates to a desired force feedback to the user 52, the microprocessor 36 sends a force feedback command to the local microprocessor 68 over the serial port connection 88. The local microprocessor 68 parses this force feedback command and sends signals to the actuator interface 80 which causes the actuator 84 to create forces F on object 76, which are experienced by the user 52 as indicated at 60. The safety switch 82, sometimes referred to as a "deadman switch", blocks the signal from the actuator interface 80 if, for example, the user 52 is no longer grasping the object 76. In this way, the user 52 can interact with the client machine 46 in a visual, auditory, and tactile fashion.

The hardware architecture described above is also described in U.S. Pat. No. 5,739,811, the disclosure of which is incorporated herein by reference. The high level command protocol between the computer and the force feedback device is also described in U.S. Pat. No. 5,734,373, the disclosure of which is incorporated herein by reference.

Figure 4A:
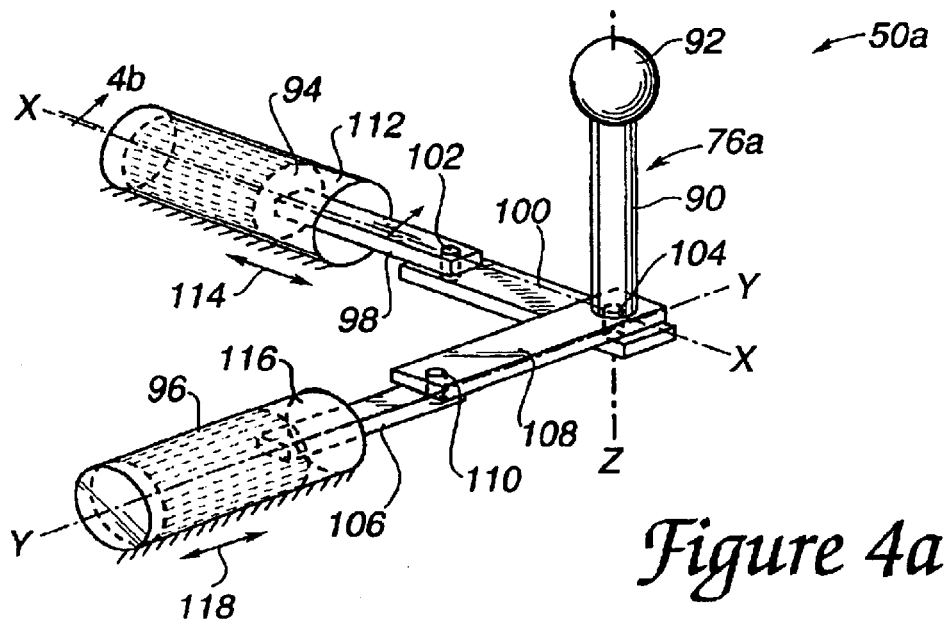
FIG. 4a is a perspective view of a preferred human/computer interface ("force feedback device") of the present invention.

In FIG. 4a, a force feedback device 50a is provided with a user manipulatable object 76a which, in this instance, includes a shaft 90 and a ball-grip (or joystick) 92. The force feedback device 50a also includes a pair of linear voice coil actuators ("voice coils") 94 and 96 that can serve both as sensors and actuators. Alternatively, the voice coils can be used only as actuators, and separate sensors (not shown) can be used. The voice coil 94 is coupled to the shaft 90 of object 76a by a first link 98 and a second link 100. Link 98 is coupled to link 100 with a pivot 102, and a link 100 is coupled to the shaft 90 by a pivot 104. Similarly, voice coil 96 is coupled to the shaft 90 of the object 76a by a first link 106 and a second link 108. The first link 106 is coupled to second link 108 by a pivot 110, and the link 108 is coupled to the shaft 90 of the object 76a by the pivot 104.

The link 98 can move in and out of a housing 112 as indicated by arrow 114, and link 106 can move in and out of a housing 116 of voice coil 96 as indicated by the arrow 118. The pivots 102, 104, and 110 allow the object 76a to move within the constraints of an x-y plane, but does not permit movement in a z direction orthogonal to the x-y plane. Therefore, the force feedback device is a two degree (2D) of freedom device. That is, the user manipulatable object 76a can move with a first degree of freedom in a x direction, and in a second degree of freedom in the y direction. A 2D force feedback device 50a is considered preferable in the present invention since it correlates well to the two-dimensional screen of a monitor of a client machine.

Figure 4B:
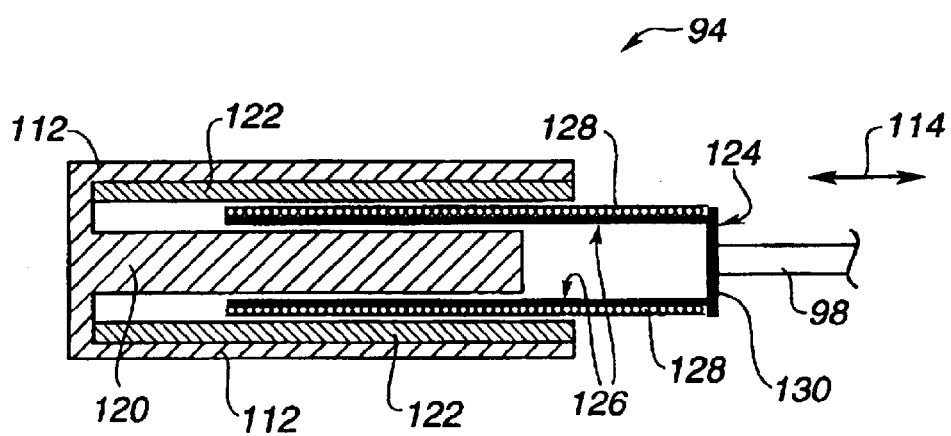

In FIG. 4b, a voice coil 94 is shown in a cross sectional view taken along line 4b—4b of FIG. 4a. The housing 112 includes a central core 120 and a number of elongated magnets 122. An armature 124 includes a hollow, cylindrical member having inner surface 126 which slidingly engages the core 120. Wrapped around the armature 124 are coils 128. The coils are electrically coupled to actuator and/or sensor interfaces. A plate 130 is attached to the end of the armature 124 and is coupled to the link 98. The armature 124 and link 98 can move in a linear fashion as indicated at 114. Other voice coil configurations can also be used, such as differently shaped cores, different coil layouts, etc.

The force feedback devices of FIGS. 4a and 4b are also described in U.S. Pat. No. 5,805,140, the disclosure of which is incorporated herein by reference. In particular, the operation of the voice coils as actuators and/or sensors is described therein.

Figure 5A:
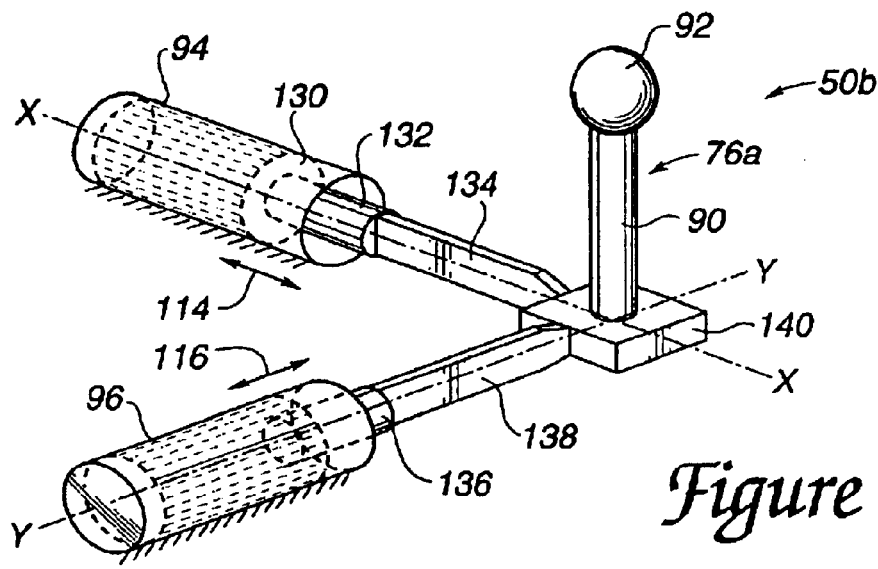
FIG. 5a is a perspective view of another preferred embodiment for a force feedback device in accordance with the present invention.

In FIG. 5a, an alternative embodiment of a force feedback device 50b is illustrated. The force feedback device 50b has many points of similarity with the force feedback device 50a, with like reference numerals referring to like elements. The force feedback device 50b includes the user manipulatable object 76a, the shaft 90, the ball knob 92, and the voice coils 94 and 96. However, the links of the force feedback device 50a have been replaced by flexure members. More particularly, the links 98 and 100 of force feedback device 50a have been replaced by a rigid connector 132 and a flexible member 134 (collectively comprising a "flexure member"), and the links 106 and 108 of the force feedback device 50a have been replaced by a connector member 136 and a flexible member 138 (also collectively comprising a flexure member). The connector 132 is rigidly attached to the plate 130 at the end of the armature of the voice coil 94 and is rigidly attached to an end of the flexible member 134. The other end of the flexible member 134 is attached to a base 140 which, in turn, is rigidly attached to the shaft 90 of the object 76a. Similarly, the connector 136 is attached to a plate of an armature of voice coil 96 at one of its ends, and is attached to the flexible member 138 at the other of its ends. The remaining end of flexible member 138 is rigidly attached to the base 140.

The flexible members 134 and 138 serve the same functions as the links of the force feedback device 50a described previously. As the object 76a is moved back and forth along an x-y plane, the flexible member 134 can move in and out of the voice coil housings 94 and 96, respectively, and can bend to accommodate angular movement with respect to the x and y axis. This permits the connectors 132 and 136 to move back and forth within the voice coils 94 and 96, respectively. The force feedback device of FIG. 5a is also described in U.S. Pat. No. 5,805,140, the disclosure of which has been incorporated herein by reference.

Figure 5B:
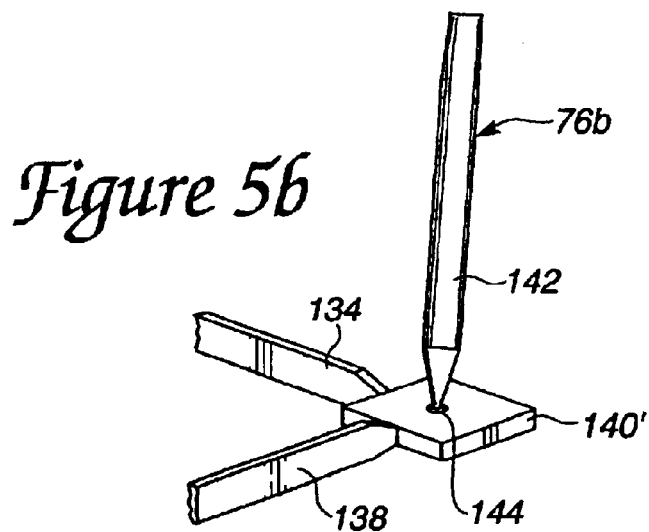

In FIG. 5b, an alternative user manipulatable object 76a takes the form of a stylus 142 which can engage an aperture 144 in an alternative base 140'. The alternative base 140' can be coupled to the flexible members 134 and 138 of the embodiment of FIG. 5a. Alternatively, the tip of stylus 142 can be rigidly or rotatably attached to alternative base 140' with, for example, a ball joint or other joint or fastener.

Figure 5C:
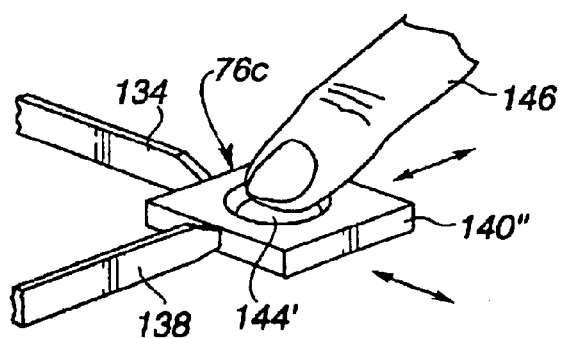

In FIG. 5c, another alternative base 140" is provided with an enlarged aperture 144' which can be engaged by the tip of a finger 146 of the user. The base 140" then becomes the user manipulatable object 76c. As before, the base 140" is coupled the flexible members 134 and 138 of the first feedback device 50b of FIG. 5a. The structures of FIGS. 5b and 5c are also described in U.S. Pat. No. 5,721,566, the disclosure of which is incorporated herein by reference.

The embodiments of FIGS. 5b and 5c illustrate two of a range of equivalent user manipulatable objects suitable for the present invention. It should be apparent to those skilled in the art that these alternative objects 76b of FIG. 5b and 76c of FIG. 5c can equally well be used with other force feedback devices, such as the force feedback device 50a illustrated in FIG. 4a.

As noted previously, a preferred embodiment of the present invention provides a user manipulatable object that has two degrees of freedom. Other user manipulatable objects having one degree of freedom or three or more degrees of freedom are also within the scope of the present invention. For example, one embodiment of the present invention provides only one degree of freedom. Other force feedback devices of the present invention include mice, joysticks, joypads, a steering wheel, and yolks having two or more degrees of freedom.

Figure 6:
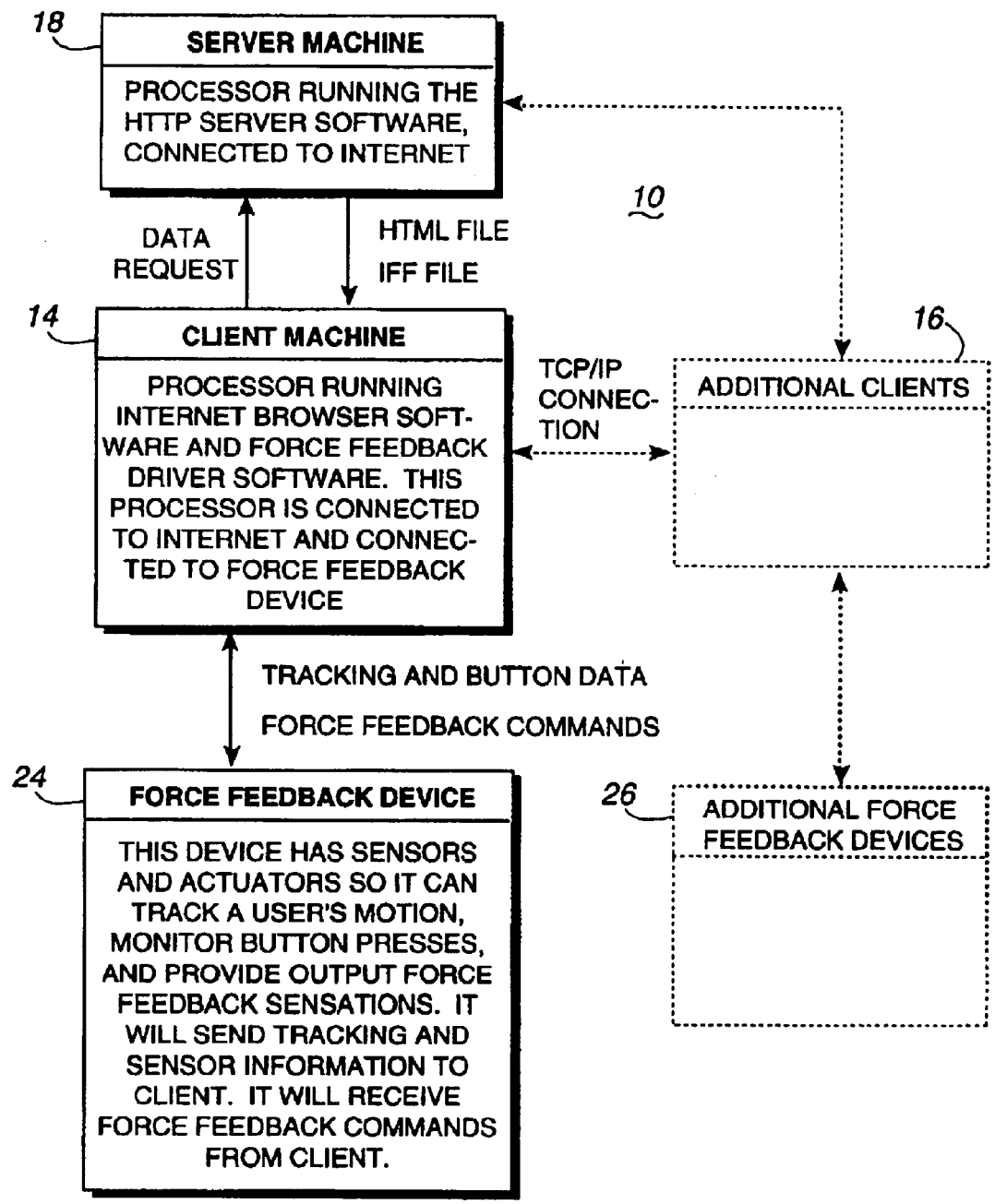
FIG. 6 is a block diagram of a wide area network (WAN) based upon Internet TCP/IP protocol and supporting World Wide Web (WWW) HTML protocols in accordance with the present invention.

In FIG. 6, a conceptual representation of the network system 10 with force feedback includes a server machine 18, a client machine 14 provided with a force feedback device 24, and one or more additional client machines 16, each of which may be provided with additional force feedback devices 26. As noted in this figure, the server machine is a computer or "processor" running, for example, the TCP/IP server software and is which is connected to the Internet. The client machine 14 includes a computer or "processor" running Internet browser software and force feedback driver software. The processor of the client machine is connected to the Internet and to the force feedback device 24. The force feedback device 24 has sensors and actuators so that it can track movement of the user manipulatable object, monitor for button presses and/or other ancillary input devices, and provide output force feedback sensations. The force feedback device 24 sends object tracking information to the client machine, and receives force feedback commands from the client machine 14. The "additional client", such as client machine 16, also includes computers or "processors" running Internet browser software and force feedback driver software. The processors of these additional clients are also connected to the Internet and are connected to force feedback devices associated with that client.

As noted in FIG. 6, a client machine 14 can send a data request to the server machine 18 and, in return, receive an HTML web page file including a special file of the present invention known as an "IFF" file. As will be appreciated by those skilled in the art, the server must also have a modified configuration file which lets it know that .IFF is a valid MIME type. This modified file would be a SRM.CONF or other .CONF file. The client machine 14 then sends force feedback commands to the force feedback device 24 and receives tracking and button data from the force feedback device 24. Client machine 16 can likewise send a data request to the server machine 18 and receive an HTML file with one or more IFF files. The client machine 16 can then interact with the force feedback device 26 by sending force feedback commands to the device 26 and by receiving tracking and button data from the force feedback device 26.

In addition to communicating with the server machine, the client machines can communicate directly with each other over the Internet using an Internet communication protocol. For example, client machine 14 can communicate with client machine 16 through a TCP/IP connection. This is accomplished making the URL of the client machine 16 known to the client machine 14, and vice versa. In this fashion, direct communication between client machines can be accomplished without involving the server machine 18. These connections can send force feedback information and other information to the other client machine. For example, a process on the client machine 16 can send force feedback information over a TCP/IP Internet connection to the client machine 14, which will then generate a force feedback command to the force feedback device 24. When the user reacts to the force feedback at force feedback device 24, this information can be sent from client machine 14 to client machine 16 to provide force feedback to the use on force feedback device 26.

Figure 7A:
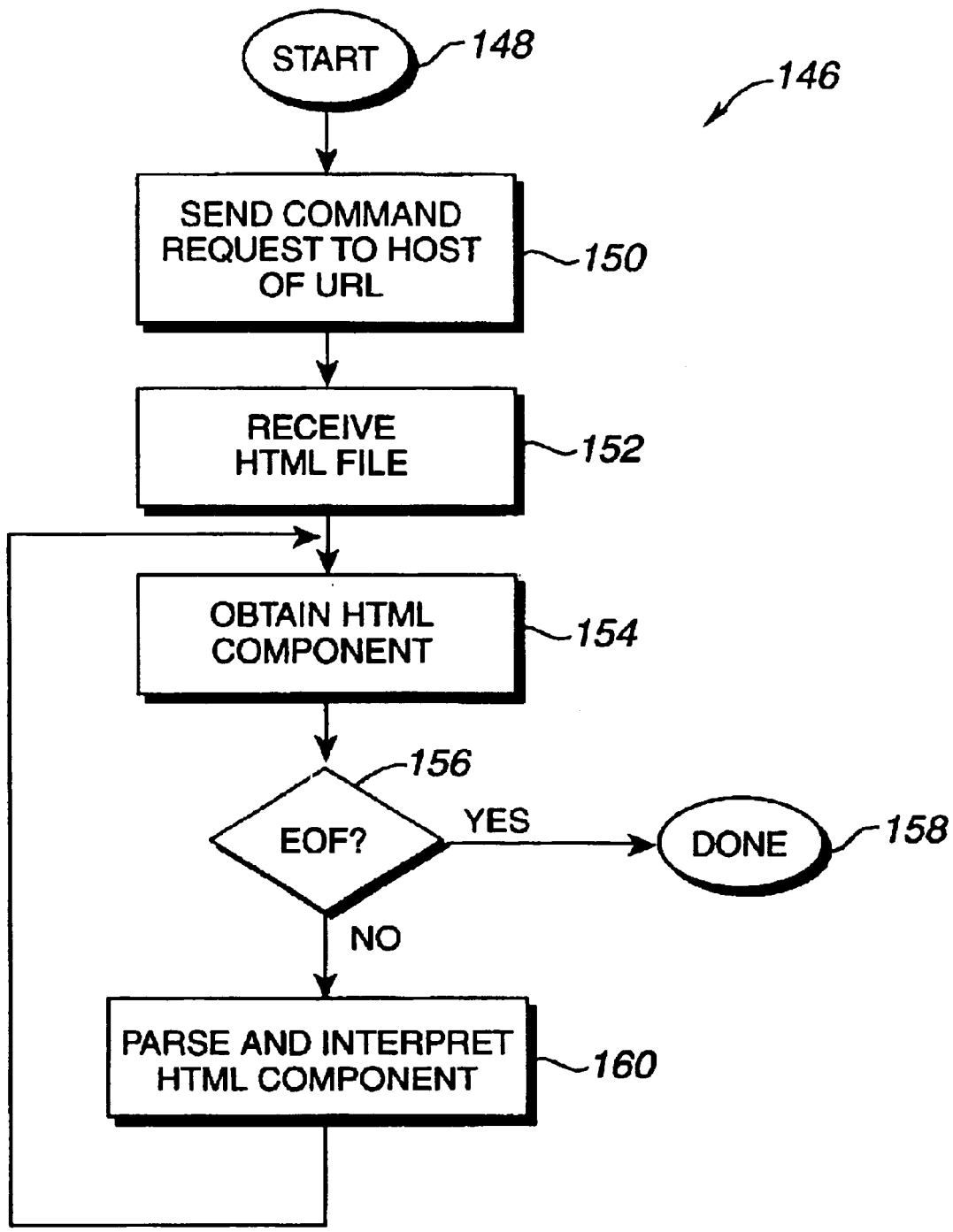
FIG. 7a is flow-diagram of a "Acquire URL" process in accordance with the present invention.

In FIG. 7a, a flow diagram illustrates an "acquire URL" process 146 running on a client machine, such as client machine 14 or client machine 16. This process 146 is preferably implemented using a standard Internet browser with a "plug-in" extension which permit the handling of force feedback commands. A preferred browser software is Netscape Navigator® software available from Netscape Corporation of Mountain View, Calif. The plug-in software is a proprietary extension of the web browser software, where this proprietary extension was developed by the Applicant of the present application.

The process 146 begins at 148 and, in a step 150, a connection request is sent to the "host" of the desired URL. The host, in this example, is a server machine 18 and the desired URL is the URL of the desired web page residing on the server machine 18, the web page including force feedback commands. Alternatively, the desired web page can reside on another server or resource and be retrieved by server machine 18. In response to the connection request of step 150, the server machine 18 sends the HTML file representing the web page over the Internet to be received by the client machine. The HTML file includes a number of "components" which are typically commands, command fragments, instructions, and data which permit the display of the web page and other web browser functionality. In a step 154, and an HTML component is obtained. If this component is the end of file ("eof"), a step 156 detects that fact and the process is completed at 158. Otherwise, the HTML component is parsed and interpreted at a step 160 and process control is returned at step 154.

It should be noted that most web browser software will start parsing and interpreting (i.e. processing) the HTML components even before the entire HTML file is received at the client machine. Alternatively, the entire HTML file can be received before the processing begins.

In FIG. 7b, an example of an HTML web page 32, sent from a web server machine 18 to a client machine (such as client machine 14 or 16) over the Internet 12, is shown. The HTML file 32 includes a number of "components" which are parsed and interpreted as previously described. An HTML file begins with a <HTML> command 162 to indicate the start of the HTML file, and a <BODY> command 164 to indicate that the body of the HTML file is beginning. Then, an arbitrary number of HTML commands 166 are provided to, for example, display images of the web page on the video display of the client machine. A <CENTER> command 168 will cause a centering of following objects with respect to the browser window on the video display of the client machine. Next, an <EMBED . . . > command 170 of the present invention defines a force button object that will be displayed on the client machine. Since the <CENTER> command 168 was given just prior to the <EMBED . . . > command, this "force button" will be centered in the displayed browser window. Other force objects besides button objects can also be defined and displayed, such as links, text, sliders, game objects (balls, paddles, etc.), avatars, windows, icons, menu bars, drop-down menus, or other objects.

In a first line 172 of the <EMBED . . . > command, the force button object is defined by a "IFF" extension file, namely "FORCEBUTTON.IFF." Next, in a line 174, the size of the button is indicated to be 100 pixels by 100 pixels. In a line 176, the initial state of the button is indicated to be "up" (i.e., unselected), and a line 178 defines the force effect to be "vibration." A number of parameters 180 defining the character and nature of the vibration are also provided (start time, length, frequency, magnitude, etc.). In a line 182, the "trigger" for the force effect is given by the function "MOUSEWITHIN" with its associated parameters, and by the function "BUTTONSTATE." The function MOUSEWITHIN determines whether the pointer icon, the position of which is controlled by the force feedback device, is within the specified boundaries defining a region of the force button. This region can be specified by the parameters and, for example, can be defined as the exact displayed area of the button, or can be defined as a sub-region within the button that is smaller than the displayed size of the button. The function BUTTONSTATE determines whether a button or switch of the force feedback device is in the desired state to trigger the force object event (e.g., a button event in this example). In a line 184, the icon representing the force button is specified as "LOUIS.GIF," and the text associated with the button is defined as "Hi, I'm Louis" in a line 186. The font of the text is given as "Helvetica" in a line 188. Other force effects, triggers and parameters can also be associated with the force object. For example, a force (such as a vibration) can be triggered if the pointing icon is moved a predetermined velocity or within a predefined range of velocities within the force object. Or, a trajectory of the pointing icon on a force object can trigger a force, like a circle gesture.

The <EMBED . . . > command is an existing functionality of HTML. It essentially embeds function calls which are handled by the web browser. If the suffix of the specified file is a known, standard suffix type, the call is executed directly by the web browser. If, however, the suffix (.IFF in this instance) is not a standard feature of the web browser, the browser will first look for a "plug-in" to implement this feature and, if a suitable plug-in is not found, it will look for application programs implementing this feature. In the preferred embodiment of the present invention, a plug-in including a reference to a Dynamically Linked Library (DLL) is provided to give functionality to the .IFF suffix. The DLL can be provided local to the client machine or on another linked resource.

With continuing reference to FIG. 7b, the centering command is terminated at line 190 with the </CENTER> command. Additional HTML commands 192 can then be provided, and the body of the HTML file is terminated by the </BODY> command 194. The end of the HTML file is indicated at 196 with the </HTML> command, i.e. this command 196 is the "eof" command of the HTML file 32.

The present invention also provides for programmability of the embedded force feedback object. An example of this programmability is shown at 198. This optional programmable command can be inserted into the EMBED command 170 and can include, for example, an iterative loop. In line 200, a "FOR" command initializes a counter i to 0, indicates that the counter I is incremented by one per each pass through the loop, and it indicates that the loop should be completed five times, i.e. while i<5. The body of the loop includes a command line 202 which indicates that a force feedback "vibrate" with associated parameters should be evoked, and a line 204 indicates that a 5 second wait should be provided after the vibration has occurred. This step will repeat five times, i.e. the command 198 will cause five vibration sequences separated by four 5 second pauses, and followed by a final 5 second pause. By providing programmability to the force feedback object, force feedback effects based upon past events and upon a complex interaction of factors can be provided.

Figure 8:
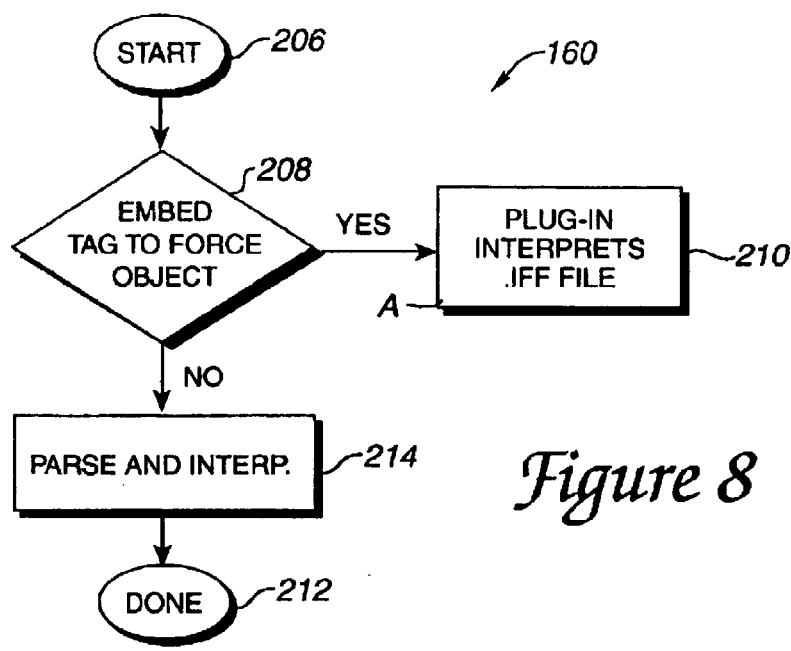

In FIG. 8, the "Parse And Interpret HTML Component" or simply "Process HTML Component" step 160 of FIG. 7a is illustrated in greater detail. In FIG. 8, process 160 begins at 206 and, in a step 208, it is determined whether there is an embedded "tag" for a force object, e.g. a tag having an .IFF reference. An example of the embedded tag is shown at the EMBED command 170 of FIG. 7b. If there is such a tag, step 210 uses the plug-in software of the present invention to interpret the .IFF file, and the process is completed at 212. Otherwise, another type of HTML command has been encountered, and the standard web browser parser and interpreter processes this HTML component in a step 214, after which the process is completed at 212.

Figure 9:
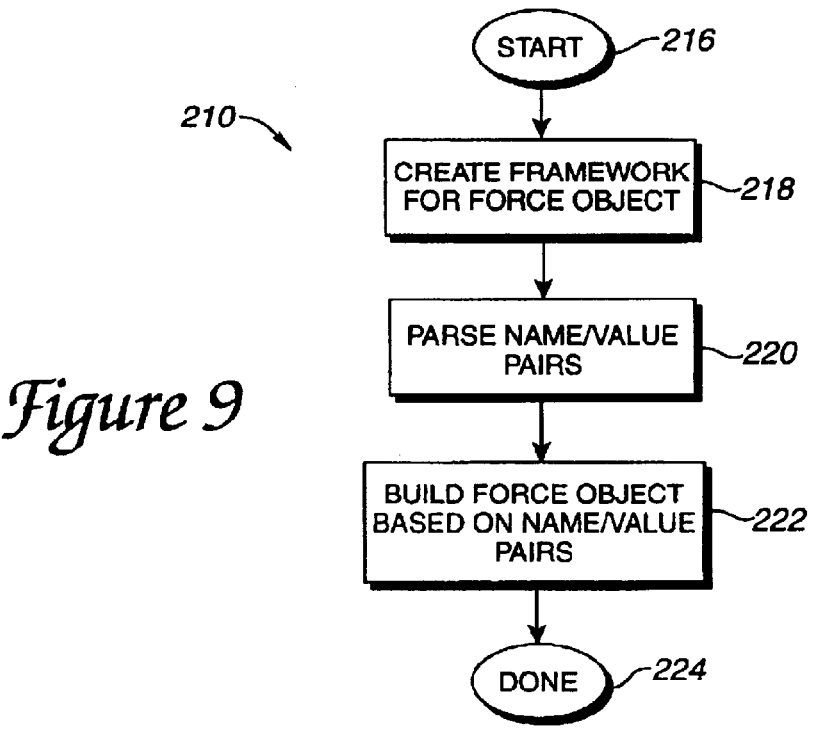
FIG. 9 is a flow-diagram of the "Plug-in Interpret .IFF File" step of FIG. 8.

In FIG. 9, the step 210 "Plug-In Interprets .IFF File" of FIG. 8 is described in greater detail. Process 210 begins at 216, and in a step 218, a "framework" is created for the force object. The framework provides a particular set of generic features to implement the specified force object, and preferably includes no specific parameters or functions for the force object. Next, in a step 220, the name/value pairs are parsed and, in a step 222, the force object is built upon this framework based upon the name/value pairs. A name/value pair includes the name of a component and its associated parameters. For example, one name might be "BUTTONSTATE" and its value (or parameter) might be "UP" (or "UNSELECTED"). The process 210 is completed at 224.

Figure 9A:
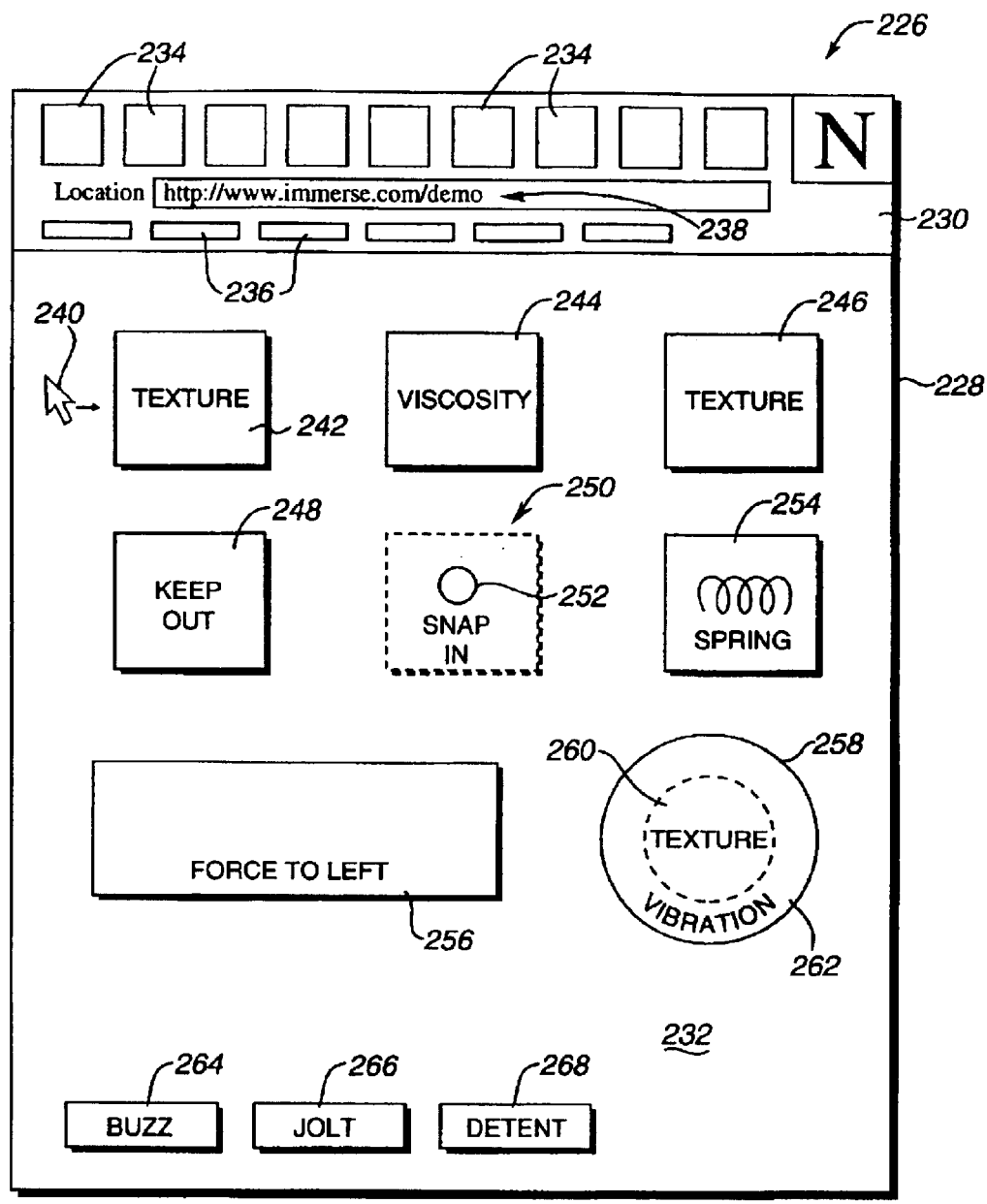
FIG. 9a is an illustration of an image displayed on a visual display of a client computer as generated from a downloaded HTML web page file.

In FIG. 9a, an image 226 to be displayed on a screen of a video monitor or other visual display is illustrated. More specifically, image 226 can be generated by the popular Netscape Navigator® web browser. The image 226 includes a window 228 including a header portion 230 and a body portion 232. The header portion 230 includes a number of navigation buttons 234 and special purpose buttons 236 for purposes well-known to those familiar with the Netscape Navigator web browser. In addition, the header portion 230 displays the URL of the currently displayed web page at 238. In this instance, the URL is "http://www.immerse.com/demo." The images displayed within the body portion 232 of the window 228 are created by the aforementioned processing of the HTML file by the web browser.

The area within the body portion 232 has been provided with a number of regions and buttons to illustrate some of the concepts of the present invention. The force feedback device controls the position of a pointer icon 240 which can be caused to interact with the various regions and buttons. As an example, when the force feedback device is manipulated by the user to cause the pointer icon 240 to move within a "texture" region 242, force feedback commands can be created for the force feedback device to provide a desired "texture" to the force feedback device. For example, the texture can feel "rough" to the user by causing the force feedback device to place forces on the user manipulatable object that emulate a rough or bumpy surface. In a region 244, a "viscosity" force feedback can be provided. With this form of force feedback, as the pointer icon is moved through field 244, a viscous "drag" force is emulated on the user manipulatable object. In a region 246, inertial forces can be felt. Therefore, a pointer icon being moved through an "inertia" region would require relatively little or no force to move in a straight line, but would require greater forces to accelerate in a new direction or to be stopped. The inertial force sensations can be applied to the user manipulatable object and felt by the user. In a "keep out" region 248, the pointer image is prevented from entering the region. This is accomplished by creating a repulsive force on the user manipulatable object using a force feedback command to the force feedback device which prevents or inhibits the user from moving the user manipulatable object in a direction of the region 248 when the pointer icon 240 contacts the periphery of the region 248. In contrast, a "snap-in" region 250 will pull a pointer icon 240 to a center 252 whenever the pointer icon engages the periphery of the snap-in region 250 and apply a corresponding attractive force on the user manipulatable object. A "spring" region 243 emulates a spring function such that a pointer icon moving into the spring region "compresses" a spring, which exerts a spring force on the user manipulatable object which opposes the movement of the pointer icon. A region 256 is a "Force To Left" region where the pointer icon within the region 256 is forced to the left side of the region and the user manipulatable object is forced in a corresponding direction as if influenced by some invisible magnetic force or gravitational force. A region 258 illustrates that regions can be of any size or shape and that within a region different force effects can be developed. In this example, within region 258 there is a texture core 260 surrounded by a vibration ring 262. Therefore, as the pointer icon 240 moves into the region 258, the user first experiences vibration from the ring 262, and then experiences a texture as the pointer icon moves within the core 260.

The exemplary force feedback web page of FIG. 9a is also provided with several force feedback buttons. In a first button 264, the placement of the pointer icon 240 over the button and the pressing of a button (i.e., a switch) on the force feedback device to create a "button click", "button down", or simply a "button event" input, will then cause a "buzz" command to be sent to the force feedback device. The buzz command would, for example, cause a vibration force on the user manipulatable object. Similarly, the selection of the "jolt" button 266 will cause a jolting force (e.g., a short-duration pulse of force) to be provided at the force feedback device, and the pressing of the "detent" button 268 will cause a "detent" to be created for the force feedback device. By "detent" it is meant that the user manipulatable object will be controlled by the force feedback actuators such that it feels as if a mechanical-type detent exists at the position that the user manipulatable object was in when the detent button 268 was activated.

These and other forces resulting from a pointing icon interacting with various objects displayed on a computer screen are also described in U.S. Pat. No. 6,219,032, the disclosure of which is incorporated herein by reference.

Figure 10:
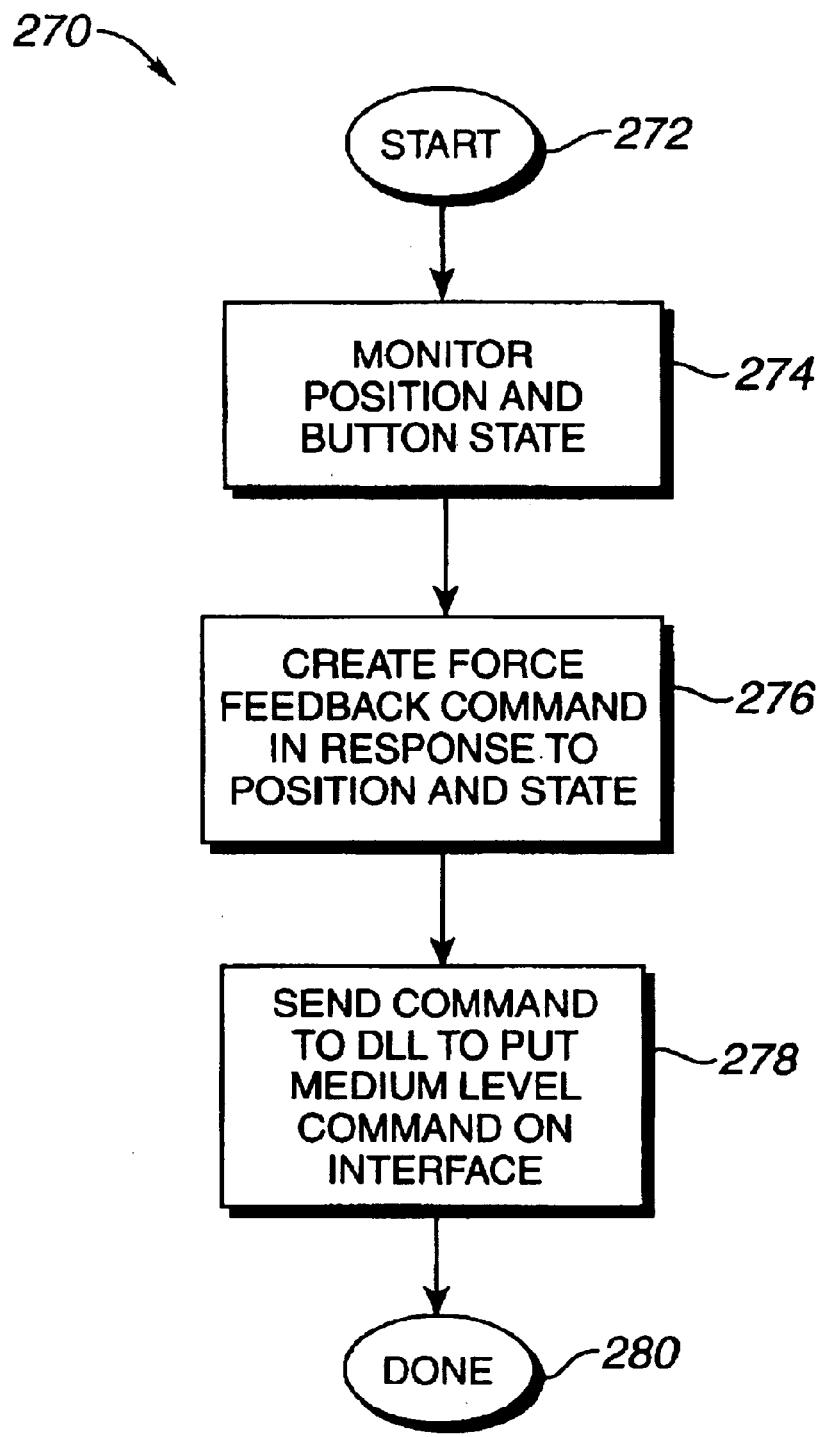
FIG. 10 is a flow-diagram of a process for monitoring the "pointer state" of the force feedback device of the present invention.

In FIG. 10, a process 270 of the plug-in software of the present invention is illustrated. The process 270 begins at 272 and, in a step 274, the position and button state of the force feedback device is monitored. Next, in a step 276, a force feedback command is created in response to the detected position and state. Finally, a command is sent to the Dynamically Linked Library (DLL) to place a force feedback command on the interface which can be parsed and interpreted by the force feedback device. The process is then completed as indicated at 280.

It should be noted that the force feedback driver (browser plug-in or DLL) can have the ability to interact with JAVA code. In this embodiment, the plug-in reads and executes JAVA commands using the browser's run-time JAVA interpreter. JAVA can optionally be used to make "aplets" which perform dynamic models, such as creating complex force feedback sensations.

It should also be noted that the force feedback device itself can have a JAVA interpreting chip on board, permitting the plug-in driver to download JAVA code to the force feedback device to be executed on the device. JAVA and JAVA interpreting chips are available under license from SUN Microcomputers of Mountain View, Calif.

Furthermore, the force feedback driver (browser plug-in or DLL) can have the ability to interact with instructions provided in other languages besides HTML. For example, virtual reality 3-D graphical environments are increasingly being created and implemented over the World Wide Web and Internet using languages such as the Virtual Reality Modeling Language (VRML) and software such as Active X available from Microsoft Corporation. In these 3-D graphical environments, users may interact with programmed 3-D objects and constructs using client computer 14 or 16, and may also interact with 3-D graphical representations (or "avatars") controlled by other users over the World Wide Web/Internet from other client computers. Force feedback commands and parameters can be provided in the instructions or files of these other protocols and languages and received by a client computer system in an equivalent manner to that described above so that force feedback can be experienced in simulated 3-D space. For example, embedded force feedback routines can be included in the VRML data for a virtual environment so that when the user moves into a virtual wall, an obstruction force is generated on the user-manipulatable object. Or, when the user carries a virtual object in a controlled virtual glove, the user might feel a simulated weight of the virtual object on the user manipulatable object. In such an embodiment, the force feedback device preferably provides the user with three or more degrees of freedom of movement so that input in three dimensions can be provided to the client computer.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method for implementing force feedback over a network, the method comprising:
   enabling an establishment of a connection between a server machine and a client machine over a network, said client machine including a visual display and a force feedback device providing, computer controlled physical force feedback to a user of said force feedback device;
   enabling reception of web page information from said server machine over said network, said web page information including screen display information representing a visual layout of a web page and force feedback information related to said visual layout of said web page;
   enabling a display of said web page on said visual display of said client machine based upon said screen display information;
   enabling reception of input information from said force feedback device for positioning, a pointer image with respect to said visual layout of said web page; and
   enabling a force feedback signal to be output to said force feedback device, said force feedback signal based upon said input information and based upon said web page information received over said network, wherein said force feedback signal causes said force feedback device to output computer controlled physical force feedback to said user correlated with said visual layout of said web page on said visual display, said force feedback being based upon said force feedback signal.

2. A method as recited in claim 1 wherein said server machine is a web server, said client machine is a network access computer.

3. A method as recited in claim 2 wherein said web server and said network access computer communicate over said network using TCP/IP protocols.

4. A method as recited in claim 2 wherein said input information includes information representing a button click of said force feedback device, said button click information affecting said force feedback.

5. A method as recited in claim 3 wherein said force feedback device includes a user manipulatable object having at least two degrees of freedom.

6. A method as recited in claim 5 wherein said force feedback device is provided with a local microprocessor which communicates with said network access computer, said force feedback device including sensors and actuators coupled to said local microprocessor, and wherein said force-feedback signal is a force feedback command, said method further comprising:
   parsing said force feedback command on said local microprocessor to control said actuators of said force feedback device in a control loop with said sensors of said force feedback device.

7. A method as recited in claim 5 further comprising:
   developing on said server machine an HTML file including said screen display information and said force-feedback information.

8. A method as recited in claim 7 wherein said HTML file includes an embedded reference that can be used to create a force feedback object on said client machine, said force feedback object including information characterizing forces output by at least one actuator included in said force feedback device, the program instructions further performing:
   parsing on said client machine said HTML file and creating on said client machine said force feedback object.

9. A method for providing force feedback over a network as recited in claim 5, the program instructions further performing:
   developing on said server machine a VRML file including said screen display information and said force-feedback information.

10. A method as recited in claim 1 wherein said server machine is a web server, said client machine is a first network access computer, said and further comprising a second network access computer coupled to said network, said second network access computer including a visual display device and a force feedback device, and wherein said web server, said first network access computer, and said second network access computer can communicate with said network using TCP/IP protocols.

11. A method as recited in claim 10 wherein said input information allows said first network access computer to position a pointer image with respect to said web page on said visual display of said first network access computer, said input information including button information representing a button click of a force feedback device of at least one of said first network access computer and said second network access computer.

12. A method for providing force feedback over a network, said method comprising:
   enabling a sending of a connection request from a client machine to a server machine over a network, said client machine including a visual display and a force feedback interface device providing computer controlled force feedback to a user of said force feedback interface device using at least one actuator;
   enabling reception of web page information from the server machine over a network, said web page information including screen display information representing a visual layout of a web page and force feedback information related to said visual layout of said web page information, wherein said web page is displayed on a client machine based upon said screen display information;
   enabling parsing of a component from said received web page information; and
   enabling provision of said component to a force feedback interpreting process if said component is a force feedback component, wherein said force feedback interpreting process instructs said force feedback device to output a physical force based on an interaction of a user-controlled pointer with objects displayed on said web page.

13. A method as recited in claim 12 wherein said web page information includes an HTML file, and wherein said component is an HTML component.

14. A method as recited in claim 12 wherein said force feedback interpreting process creates a force object including parameters intepreted from said force feedback component.

15. A method as recited in claim 12 further comprising interpreting said parsed component as a web page component if said component is not a force feedback component.

16. A method as recited in claim 12 wherein a network browser is provided on said client computer to perform said parsing of said component.

17. A computer data signal formulated by a general purpose computer and propagated in a transmission medium, the computer data signal comprising:
- a visual code segment comprising at least one component to be parsed and interpreted by a web browser and an associated image displayed in a web page on a display screen of a computer receiving said computer data signal; and
- a feel sensation code segment comprising at least one component to be parsed and interpreted and used to cause a physical force to be applied to a user of a force feedback device coupled to said computer receiving said computer data signal, said force being based at least in part on manipulations of said force feedback device by said user.

18. A computer data signal as recited in claim 17 wherein said computer data signal is propagated using a TCP/IP protocol and wherein said transmission medium includes the Internet.

19. A computer data signal as recited in claim 17 wherein said force is also based on interactions of a user-controlled object displayed in said web page with a different object displayed in said web page.

20. A computer data signal as recited in claim 17 wherein said computer data signal is routed as packets to said computer.

* * * * *